(12) United States Patent
Weekes et al.

(10) Patent No.: US 10,991,050 B1
(45) Date of Patent: Apr. 27, 2021

(54) USING STANDBY GENERATOR DATA TO DETERMINE DATA ASSOCIATED WITH TERMS OF RESIDENTIAL INSURANCE COVERAGE

(71) Applicant: STATE FARM MUTUAL AUTOMOBILE INSURANCE COMPANY, Bloomington, IL (US)

(72) Inventors: John H. Weekes, Bloomington, IL (US); Daryoush Hakimi-Boushehri, Bloomington, IL (US); Erin Ann Olander, Bloomington, IL (US); Dana C. Hunt, Normal, IL (US); Christopher N. Kawakita, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 661 days.

(21) Appl. No.: 15/339,450

(22) Filed: Oct. 31, 2016

Related U.S. Application Data

(60) Provisional application No. 62/368,735, filed on Jul. 29, 2016, provisional application No. 62/311,651, (Continued)

(51) Int. Cl.
*G06Q 40/08* (2012.01)
*G06F 11/34* (2006.01)
*G06Q 50/16* (2012.01)

(52) U.S. Cl.
CPC ......... *G06Q 40/08* (2013.01); *G06F 11/3466* (2013.01); *G05B 2219/24048* (2013.01);
(Continued)

(58) Field of Classification Search
None
See application file for complete search history.

(56) References Cited

U.S. PATENT DOCUMENTS 8,621,097 B2 * 12/2013 Venkatakrishnan ... G06Q 10/06
709/230
9,811,862 B1 * 11/2017 Allen ................. G06K 9/00536
(Continued)

OTHER PUBLICATIONS

Assurance Power Systems, Assurance Power Systems, Apr. 6, 2014, Assurance Power Systems, http://web.archive.org/web/20140406122634/https://assurancepower.com/services/residential-generators and http://web.archive.org/web/20140406123147/https://assurancepower.com/genstar-generator-monitoring-system (Year: 2014).*

*Primary Examiner* — Mohammad Z Shaikh
*Assistant Examiner* — Dario Bianco
(74) *Attorney, Agent, or Firm* — Marshall, Gerstein & Borun LLP

(57) ABSTRACT

A computer-implemented method of providing insurance discounts to risk averse home owners having standby generators. The method may include, with customer permission or affirmative consent, (1) receiving, at an insurance provider remote server, data that is indicative of whether a standby generator is associated with a home; (2) receiving, at the insurance provider remote server, data indicative of the current operational condition of the standby generator; and (3) determining, by the insurance provider remote server, data associated with the terms of the residential insurance coverage for the home based upon the data indicative of whether the standby generator is associated with the home and the data indicative of the current operational condition of the standby generator. The standby generator data may be generated or collected by a smart home controller, and transmitted to the insurance provider
(Continued)

via wireless communication over one or more radio links or communication channels, for instance.

19 Claims, 7 Drawing Sheets

Related U.S. Application Data filed on Mar. 22, 2016, provisional application No. 62/307,224, filed on Mar. 11, 2016.

(52) U.S. Cl.
CPC .............. *G05B 2219/31104* (2013.01); *G05B 2219/31205* (2013.01); *G05B 2219/31206* (2013.01); *G05B 2223/06* (2018.08); *G06Q 50/16* (2013.01)

(56) References Cited

U.S. PATENT DOCUMENTS

| | | | |
|---|---|---|---|
| 10,102,589 B1* | 10/2018 | Tofte ...................... | G06Q 40/08 |
| 10,296,978 B1* | 5/2019 | Corder ................... | G06Q 40/08 |
| 2012/0053741 A1* | 3/2012 | Beyerle .................... | H02J 3/12 |
| | | | 700/291 |
| 2013/0123998 A1* | 5/2013 | King ........................ | G06F 1/30 |
| | | | 700/292 |
| 2016/0239921 A1* | 8/2016 | Bray ....................... | G06Q 40/08 |
| 2016/0248251 A1* | 8/2016 | Tinnakornsrisuphap | ................... |
| | | | H02J 3/38 |

* cited by examiner

USING STANDBY GENERATOR DATA TO DETERMINE DATA ASSOCIATED WITH TERMS OF RESIDENTIAL INSURANCE COVERAGE

CROSS REFERENCE TO RELATED APPLICATIONS

This application claims the benefit of (1) U.S. Provisional Patent Application No. 62/307,224, entitled "Using Standby Generator Data to Determine Data Associated with Terms of Residential Insurance Coverage," filed Mar. 11, 2016, (2) U.S. Provisional Patent Application No. 62/311,651, entitled "Using Standby Generator Data for Providing Residential Insurance Coverage," filed Mar. 22, 2016, and (3) U.S. Provisional Patent Application No. 62/368,735, entitled "Using Standby Generator Configuration Data to Determine Data Associated with Terms of Residential Insurance Coverage," filed Jul. 29, 2016. Each of U.S. Provisional Patent Application Nos. 62/307,224, 62/311,651, and 62/368,735 is hereby expressly incorporated by reference herein in its entirety.

FIELD OF THE DISCLOSURE

The present disclosure generally relates to providing insurance coverage and, more particularly, to systems and methods for using data associated with residential property to provide insurance coverage for the residential property.

BACKGROUND

Insurance providers may provide residential insurance coverage for residential property, with a rating and/or a premium associated with such coverage being based upon data such as whether the residential property has certain security features (e.g., a lower premium for having a home security/monitoring system, and in some instances a still lower premium for having a home security/monitoring system that is professionally monitored). A rating and/or premium for residential insurance coverage may also be based upon factors including size of the residential property, structure type, age of utilities associated with the residential property, insurance claims history associated with the residential property, and proximity to fire departments.

BRIEF SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

In one aspect, data regarding a standby generator associated with residential property, such as a house or condominium building, may be received by one or more computing devices of an insurance provider. The data regarding the standby generator may indicate (i) whether the standby generator is installed at, and configured to provide power to, the residential property; (ii) an operational condition of the standby generator; and/or (iii) an amount of the residential property to which the standby generator is configured to supply backup power, for example. The one or more computing devices of the insurance provider may determine data associated with terms of residential insurance coverage for the residential property, such as one or more ratings and/or one or more premiums, based upon the data regarding the standby generator. The one or more computing devices may also adjust the data associated with the terms of the residential insurance coverage based upon updates to the data regarding the standby generator.

The data regarding the standby generator (or a portion(s) thereof) may be received from a vendor that provides the standby generator for use at the residential property, such as from one or more computing devices of the vendor, in response to an insured party consenting to, or giving permission for, the vendor making such data available to the insurance provider. In another aspect, the data regarding the standby generator (or a portion(s) thereof) may also or alternatively be received from a smart home device, such as a smart or interconnected home controller, in response to the insured party consenting to such data being made available to the insurance provider. In yet another aspect, the data regarding the standby generator (or a portion(s) thereof) may also or alternatively be received from the insured party.

In one aspect, a computer-implemented method of using standby generator data to determine data associated with terms of residential insurance coverage may be provided. A method may include: (1) receiving, at one or more insurance provider computing devices associated with an insurance provider, data from a source other than the insurance provider (such as via wireless communication or data transmission over one or more radio frequency links or wireless communication channels) that is indicative of whether a standby generator is associated with residential property, the residential property being at least one of (i) residential property for which the residential insurance coverage is provided by the insurance provider, or (ii) residential property for which the insurance provider is a prospective provider of the residential insurance coverage; (2) receiving, at the one or more insurance provider computing devices when data from a source other than the insurance provider that is indicative of an operational condition of the standby generator is available, the data indicative of the operational condition of the standby generator; and/or (3) determining, by one or more processors of the one or more insurance provider computing devices, the data associated with the terms of the residential insurance coverage for the residential property based upon at least one of (a) the data indicative of whether the standby generator is associated with the residential property, or (b) the data indicative of the operational condition of the standby generator. The method may include additional, fewer, or alternate actions, including those discussed elsewhere herein.

In another aspect, a computer system configured to use standby generator data to determine data associated with terms of residential insurance coverage may be provided. A computer system may include at least one of one or more processors or associated transceivers. The at least one of the one or more processors or the associated transceivers may be configured to: (1) receive data (such as via wireless communication or data transmission over one or more radio frequency links or wireless communication channels) from a source other than an insurance provider that is indicative of whether a standby generator is associated with residential property, the residential property being at least one of (i) residential property for which the residential insurance coverage is provided by the insurance provider, or (ii) residential property for which the insurance provider is a prospective provider of the residential insurance coverage; (2) receive, when data from a source other than the insurance provider that is indicative of an operational condition of the standby generator is available, the data indicative of the operational condition of the standby generator; and/or (3) determine the data associated with the terms of the residential insurance coverage for the residential property based upon at least one of (a) the data indicative of whether the standby generator is associated with the residential property, or (b) the data indicative of the operational condition of the standby generator. The at least one of the one or more processors or the associated transceivers may be configured to perform additional, fewer, or alternate actions, including those discussed elsewhere herein.

In yet another aspect, a system of using standby generator data to determine data associated with terms of residential insurance coverage may be provided. A system may include one or more insurance provider computing devices associated with an insurance provider. The one or more insurance provider computing devices may be configured to: (1) receive data from a source other than the insurance provider that is indicative of whether a standby generator is associated with residential property, the residential property being at least one of (i) residential property for which the residential insurance coverage is provided by the insurance provider, or (ii) residential property for which the insurance provider is a prospective provider of the residential insurance coverage; (2) receive, when data from a source other than the insurance provider that is indicative of an operational condition of the standby generator is available, the data indicative of the operational condition of the standby generator; (3) determine the data associated with the terms of the residential insurance coverage for the residential property based upon at least one of the data indicative of whether the standby generator is associated with the residential property or the data indicative of the operational condition of the standby generator; and/or (4) adjust the data associated with the terms of the residential insurance coverage for the residential property based upon the one or more insurance provider computing devices receiving at least one of (a) data indicative of an update to whether the standby generator is associated with the residential property, or (b) data indicative of an updated operational condition of the standby generator. The one or more insurance provider computing devices may be configured to perform additional, fewer, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
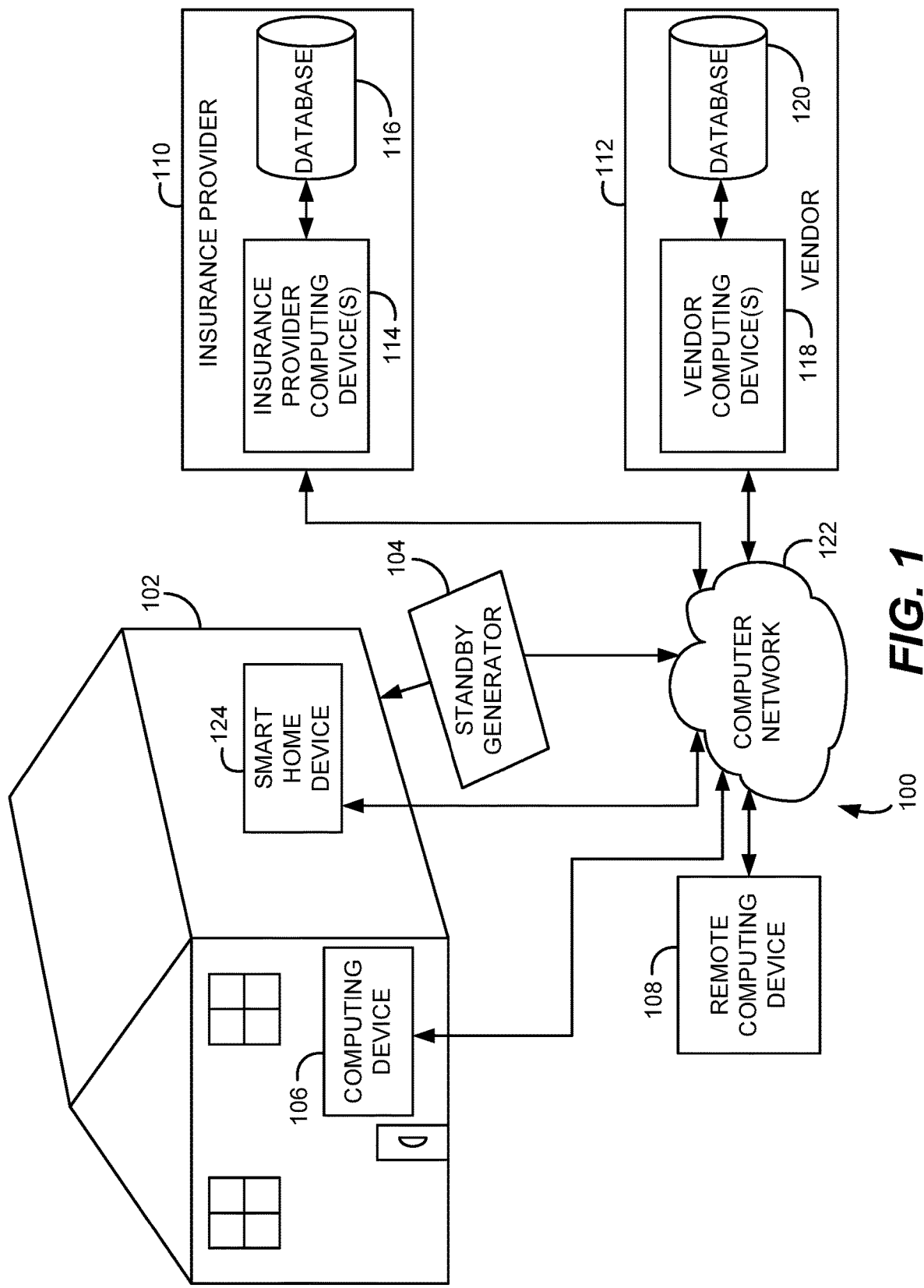
FIG. 1 illustrates a block diagram of an exemplary insurance data determination system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining data associated with terms of residential insurance coverage for residential property based upon (i) data indicative of whether a standby generator is associated with (e.g., installed at so as to provide backup power to) the residential property, and/or (ii) data indicative of an operational condition of the standby generator. For instance, the data associated with the terms of the residential insurance coverage may include data associated with a model implemented by the provision of the residential insurance coverage, such as a pricing model and/or a discount model. For example, the provision of the residential insurance coverage by an insurance provider may include implementing a pricing model and/or discount model by determining a rating(s) and/or a premium(s) (or discount(s)) associated with the residential insurance coverage based upon one or more of the aforementioned types of data related to a standby generator. The residential property may be or may include, for instance, a house, a townhouse, a condominium, common elements and/or structure of a residential building such as a condominium building, a rented residence such as an apartment, etc.

By determining the data associated with the terms of the residential insurance coverage based upon the data indicative of whether the standby generator is associated with the residential property and/or the data indicative of the operational condition of the standby generator, more favorable ratings and/or premium discounts, for example, may be provided for coverage for residential property having an associated standby generator. Such better/more favorable ratings and/or premium discounts may be provided based upon a determination or assumption that when residential property has an associated standby generator installed to provide backup power, an associated insured party represents a relatively favorable risk profile to the insurance provider. This relatively favorable risk profile may be determined to exist based upon a determination that, with an associated standby generator installed, the residential property/an associated insured party is less likely to sustain loss, and/or likely to sustain less severe loss, in the event of an outage of the main power supplied to the residential property as compared to the case of residential property without an associated/installed standby generator. Additionally, determined ratings may be better, and/or determined premium discounts may be higher, for a better (e.g., higher-quality) operational condition of the standby generator, and vice versa, based upon a determination or assumption that better operational condition reduces the likelihood and/or the likely severity of loss associated with residential property in the event of an outage of the main power supplied to the residential property. Thus, it will be appreciated that the data associated with the terms of the residential insurance coverage may include at least one of a rating(s) associated with the residential insurance coverage or a premium(s) associated with the residential insurance coverage.

The data associated with the terms of the residential insurance coverage may be adjusted based upon receiving at least one of data indicative of an update to whether the standby generator is associated with the residential property, or data indicative of an updated operational condition of the standby generator. In this manner, the insurance provider may continue to provide, for example, a rating(s) and/or a premium discount(s) that reflect the status of the installation and operation of the standby generator at the residential property.

In some aspects, the data indicative of whether a standby generator is associated with the residential property and/or the data indicative of an operational condition of the standby generator may be received by a processor(s) of an insurance provider computing device(s) (e.g., a processor(s) of an insurance provider server(s)) from a vendor computing device(s). In some aspects, the vendor computing device(s) may be a server(s) of a vendor of the standby generator. The vendor may in some instances be a manufacturer, installer, reseller, or dealer of the standby generator. The data received by the processor(s) of the insurance provider computing device(s) may be received from the vendor computing device(s) in response to an insured party associated with the residential property (e.g., a homeowner, condominium association board, etc.) consenting to the vendor making such data available to the insurance provider.

In other aspects, the data indicative of whether a standby generator is associated with the residential property and/or the data indicative of an operational condition of the standby generator may be received by the processor(s) of the insurance provider computing device(s) from a "smart" home device (e.g., by the processor(s) accessing such data from the smart home device). The smart home device may be, for example, a smart home controller or other suitable home automation and/or control device, and may receive and/or provide more data associated with the residential property than typical devices in residential property such as traditional thermostats. Additionally or alternatively, the smart home device may control various aspects of the residential property such as thermostat settings, home security system settings, etc. The data indicative of whether the standby generator is associated with the residential property and/or the data indicative of the operational condition of the standby generator may be received by the smart home device from the standby generator and may be received by the processor(s) of the insurance provider computing device(s) in response to the insured party giving affirmative consent or permission to such data being made available to (e.g., being made accessible to) the insurance provider.

The data indicative of the operational condition of the standby generator may include, for instance, data indicative of one or more of (i) whether an oil change is needed for the standby generator, (ii) whether an oil filter of the standby generator needs to be replaced, (iii) whether one or more spark plugs of the standby generator need to be replaced, (iv) whether an air filter of the standby generator needs to be replaced, (v) whether an air filter pre-cleaner of the standby generator needs to be replaced, (vi) whether a battery level of a battery of the standby generator needs to be increased (e.g., is below a threshold battery level), (vii) whether the standby generator is operational or comes online within a predetermined amount of time, etc. The insurance provider computing device(s) may thus determine the data associated with the terms of the residential insurance coverage based upon such data indicative of the health or quality of operation of the standby generator.

Furthermore, by adjusting the data associated with the terms of the residential insurance coverage based upon, for example, an update(s) to the data indicative of one or more of (i) whether an oil change is needed, (ii) whether an oil filter needs to be replaced, (iii) whether a spark plug(s) need(s) to be replaced, (iv) whether an air filter needs to be replaced, (v) whether an air filter pre-cleaner needs to be replaced, (vi) whether a battery level needs to be increased, (vii) whether the standby generator is operational, or comes online within a predetermined amount of time, etc., the terms of the residential insurance coverage may reflect changes in the operational condition of the standby generator over time.

The one or more insurance provider computing devices may also or alternatively receive data indicative of an amount of the residential property to which the standby generator is configured (e.g. installed) to supply power. For instance, the standby generator may be installed at the residential property by the manufacturer or other installer so as to provide backup power to only a portion of the residential property. In one aspect, the standby generator may be installed so as to provide backup power to kitchen appliances (e.g., one or more of a refrigerator, a freezer, a stove, a conventional oven, a microwave oven, etc.), a heating element (e.g., one or more of a furnace, boiler, etc.), a sump pump, one or more electronic devices such as a television, one or more lighting elements such as a light fixture(s) and/or lamp(s), and/or one or more home security devices such as a home security and/or monitoring system. In other aspects, the standby generator may be configured/installed so as to provide backup power to a different suitable and/or desired device or devices. Other devices to which the standby generator may be configured to provide backup power may include, for instance, one or more life safety devices (e.g., smoke detectors, a control panel for a notification system in the residential property, etc.), a water well pump, a sewage pump, a septic pump, etc. The data associated with the terms of the residential insurance coverage may be determined further based upon the amount of the residential property to which the standby generator is configured to provide power, including in some aspects based upon the number and/or type(s) of devices/appliances to which the standby generator is configured to provide power.

In one aspect, the insurance provider computing device(s) may also or alternatively receive data indicative of an amount of use of the standby generator to supply power (e.g., during an outage of the main power supplied to the residential property) during a period of time (e.g., a particular and/or predetermined period of time). Based upon such data, the insurance provider computing device(s) may determine an indication of a quality or health of an electrical network (e.g., power grid or portion thereof) that provides power to the residential property and to additional residential property (e.g., one or more neighboring houses and/or entire nearby neighborhoods, depending upon the number of residential properties served by the electrical network). Based upon the indication of the quality/health of the electrical network, the insurance provider computing device(s) may determine and/or adjust a rating and/or a premium for additional residential insurance coverage associated with such additional residential property. Thus, the insurance provider may determine a rating(s) and/or a premium(s) associated with residential insurance coverage for one or more additional residential properties based upon the quality of the electrical network supplying power to such one or more additional residential properties, where such quality of the electrical network may be determined even if such one or more additional residential properties do not themselves have standby generators.

Exemplary Determining of Data Associated with Terms of Insurance

The systems and methods disclosed herein relate generally to determining data associated with terms of residential insurance coverage using standby generator data. More particularly, the systems and methods determine and/or adjust data associated with terms of residential insurance coverage based upon the advantageous receipt of data from a source other than an insurance provider of data regarding a standby generator associated with residential property. The source other than the insurance provider may, as described above, be a vendor of the standby generator associated with the residential property, or may be a smart home device, an insured party that provides the data regarding the standby generator to the insurance provider, etc. The data regarding the standby generator may include, for example, data indicative of whether the standby generator is associated with the residential property (e.g., data indicating that the standby generator is installed at the residential property) and/or data indicative of an operational condition of the standby generator. By receiving such data from an appropriate source, an insurance provider may more accurately determine, for instance, a rating and/or a premium for residential insurance coverage for the residential property, such as by reducing a premium based upon the residential property having the standby generator installed and providing increased premium reductions corresponding to indications of increased health or quality of operation of the standby generator.

Thus, by receiving the aforementioned data from an appropriate source, the systems and methods provide a benefit to residential insurance customers who have standby generators installed, and may further provide increased premium reductions depending upon the amount of a residential property to which a standby generator is configured to provide power in the event of a main power supply outage. With reference to the discussion above, the systems and methods may also advantageously allow the insurance provider to determine ratings and/or premiums for additional residential properties as a result of a determination regarding the quality of an electrical network, where the determination regarding the quality of the electrical network may be made based upon data associated with a (different) residential property (or properties) that has/have a standby generator(s) installed.

Accordingly, the present embodiments may improve the technologies of, for instance, (1) computerized determination and/or calculation (e.g., by an insurance provider computing device(s)) of data associated with terms of residential insurance coverage, and/or (2) computerized adjustment and/or re-determination and/or re-calculation, etc., of such data (e.g., by the insurance provider computing device(s)) by using solutions or improvements in another technological field. For instance, with reference to the foregoing discussion, the present embodiments may use solutions or improvements associated with data regarding a standby generator, and more particularly, solutions or improvements including the provision of data regarding a standby generator to the insurance provider computing device(s) from, for instance, a vendor computing device(s) or a smart home device. As such, the present embodiments may improve the nature of systems and methods for determining data associated with terms of residential insurance coverage by using standby generator data from an appropriate source, as discussed herein. Consequently, for at least the foregoing reasons, the systems and methods described herein are directed to an improvement to computer functionality, and improve the functioning of conventional computers. Other advantages will be recognized by one of ordinary skill in the art in light of the teaching and disclosure herein.

Exemplary System for Using Standby Generator Data to Determine Data Associated with Terms of Insurance FIG. 1 illustrates a block diagram of an exemplary insurance data determination system 100 in accordance with an exemplary aspect of the present disclosure. In some aspects, insurance data determination system 100 may include hardware and software entities, applications, components, and devices configured to determine data associated with terms of residential insurance coverage. It should be appreciated that additional, fewer, or alternate entities, applications, components, and devices may be implemented.

In one aspect, as shown in FIG. 1, insurance data determination system 100 may include residential property 102 that is depicted as a house but in some aspects may be or may include, for example, a townhouse, a condominium, common elements and/or structure of a residential building such as a condominium building, a rented residence such as an apartment, etc. Insurance data determination system 100 may also include a standby generator 104 associated with residential property 102 (e.g., installed outside residential property 102 and configured to provide backup power to at least a portion of residential property 102 in the event of an outage of the main power supplied from an electrical network to residential property 102). Standby generator 104 may operate automatically to provide backup power to the at least the portion of residential property 102 in response to, for instance, sensing the outage of the main power supplied. In this manner, standby generator 104 may ensure an essentially continuous supply of power to the at least the portion of residential property 102 as opposed to, for example, a portable generator that may not ensure an essentially continuous supply of power in some instances.

In one aspect, residential property 102 may include a computing device 106 therein that may be used by a party associated with residential property 102 (e.g., an insured party or prospective insured party such as a homeowner, condominium association board, etc.). Computing device 106 may be any suitable computing device such as, but not limited to, a desktop computer, a laptop computer, a mobile phone such as a smart phone, a tablet, a phablet, smart glasses, other wearable computing device(s) or mobile devices, etc. Insurance data determination system 100 may also or alternatively include a remote computing device 108 in a location different from that of residential property 102, which may also or alternatively be used by, for instance, the insured party. Remote computing device 108 may be any suitable computing device such as, but not limited to, the example types of computing devices described with respect to computing device 106.

In one aspect, insurance data determination system 100 may also include an insurance provider 110 and a vendor 112. Insurance provider 110 may provide residential insurance coverage with respect to residential property 102 or may be a prospective provider of residential insurance coverage with respect to residential property 102. Vendor 112 may be, for instance, a manufacturer, installer, dealer, or reseller of standby generator 104. One or more insurance provider computing devices 114 may be associated with insurance provider 110 (e.g., maintained, operated, and/or utilized by insurance provider 110). Insurance provider computing device(s) 114 may be communicatively coupled to an insurance provider database (or databases) 116 (e.g., one or more hard disk drives, optical storage drives, solid state storage devices, etc.). One or more vendor computing devices 118 may be associated with vendor 112 (e.g., maintained, operated, and/or utilized by vendor 112). Vendor computing device(s) 118 may be communicatively coupled to a vendor database (or databases) 120 (e.g., one or more hard disk drives, optical storage drives, solid state storage devices, etc.).

In one aspect, insurance data determination system 100 may further include a computer network 122. In an aspect, each of standby generator 104, computing device 106, remote computing device 108, insurance provider 110, and vendor 112 may be communicatively coupled to computer network 122. For instance, insurance provider 110 and/or vendor 112 may be communicatively coupled to computer network 122 by way of insurance provider computing device(s) 114 and/or vendor computing device(s) 118 being communicatively coupled to computer network 122. Computer network 122 may include any suitable number of interconnected network components that form an aggregate network system. Computer network 122 may be or may include at least a portion of a network such as the Internet and/or any other type of suitable network (e.g., a BLUETOOTH network, a local area network (LAN), a metropolitan area network (MAN), a wide area network (WAN), a mobile network, a wired or wireless network, a private network, a virtual private network, etc.). Computer network 122 may also or alternatively be or include, for instance, one or more cellular networks such as a code division multiple access (CDMA) network, a GSM (Global System for Mobile Communications) network, a WIMAX (Worldwide Interoperability for Microwave Access) network, a Long Term Evolution (LTE) network, etc.

In one aspect, insurance provider 110 may receive data indicative of whether a standby generator is associated with residential property 102. For instance, insurance provider computing device(s) 114 may receive data indicating that standby generator 104 is installed outside residential property 102. As further discussed below, such data may be received from a source other than insurance provider 110. Insurance provider 110 may also receive data (e.g., by insurance provider computing device(s) 114 receiving data) indicative of an operational condition of standby generator 104 when such data is available from a source other than insurance provider 110 (examples of such other sources being further discussed below).

In another aspect, insurance provider computing device(s) 114 may determine, such as by one or more processors of insurance provider computing device(s) 114, data associated with terms of the residential insurance coverage with respect to residential property 102. Such data may include, for instance, one or more ratings that the insurance provider uses to determine terms of the residential insurance coverage. The data associated with the terms of the residential insurance coverage may also include, for instance, one or more premiums for the residential insurance coverage. As further discussed below, the data associated with the terms of the residential insurance coverage may be determined based upon at least one of (1) the data indicative of whether standby generator 104 is associated with residential property 102, or (2) the data indicative of the operational condition of standby generator 104.

In one aspect, the processor(s) of insurance provider computing device(s) 114 may adjust the data associated with the terms of the residential insurance coverage based upon receiving at least one of (1) data indicative of an update to whether standby generator 104 is associated with residential property 102, or (2) data indicative of an updated operational condition of standby generator 104.

As further discussed below, the data indicative of the operational condition of standby generator 104 may include at least one of data indicative of whether an oil change is needed for standby generator 104, data indicative of whether an oil filter of standby generator 104 needs to be replaced, data indicative of whether one or more spark plugs of standby generator 104 need to be replaced, data indicative of whether an air filter of standby generator 104 needs to be replaced, data indicative of whether an air filter of standby generator 104 needs to be replaced, data indicative of whether a battery level of a battery of standby generator 104 needs to be increased, or whether standby generator 104 is operational and/or whether routine or periodic standby generator 104 maintenance has been performed. In various aspects, as also further discussed below, the data indicative of whether standby generator 104 is associated with residential property 102 and/or the data indicative of the operational condition of standby generator 104 may be received from vendor 112 (e.g., vendor computing device(s) 118), from a smart home device 124 (e.g., a smart home controller, other home automation device, etc.), or from the insured party. Such data may be received from the insured party via, for instance, computing device 106, remote computing device 108, or any other suitable means such as a telephone call to insurance provider 110, physical visit to an office associated with insurance provider 110, etc.

It should be appreciated that while standby generator 104 is shown in FIG. 1 as being coupled to residential property 102 is general, standby generator 104 may more particularly be coupled to residential property 102 as needed to supply backup power to particular device(s)/element(s) within residential property 102. It should further be appreciated that standby generator 104 may also be communicatively coupled to, for instance, smart home device 124 where data regarding standby generator 104 (e.g., the data indicative of whether standby generator 104 is associated with residential property 102 and/or the data indicative of the operational condition of standby generator 104) is received from smart home device 124.

In one aspect, as also further discussed below, insurance provider computing device(s) 114 may receive data indicative of an amount of residential property 102 to which standby generator 104 is configured to supply/provide power. For instance, such data may include data indicative of whether standby generator 104 is configured to supply power to at least one of a heating element, a sump pump, a refrigerator, a freezer, a stove, an oven, an electronic device(s), a home security device(s), a life safety device(s), a water well pump, a sewage pump, or a septic pump. The processor(s) of insurance provider computing device(s) 114 may determine the data associated with the terms of the residential insurance coverage further based upon the data indicative of the amount of residential property 102 to which standby generator 104 is configured to supply/provide power.

In yet another aspect, as still further discussed below, insurance provider computing device(s) 114 may receive data indicative of an amount of use of standby generator 104 to supply power (e.g., backup power during an outage of the main power supplied to residential property 102) during a period of time. The processor(s) of insurance provider computing device(s) 114 may determine an indication of a quality of an electrical network that provides power to residential property 102 and to additional residential property (not shown in FIG. 1) based upon the data indicative of the amount of use of standby generator 104 to supply power during the period of time. The processor(s) of insurance provider computing device(s) 114 may determine, based upon the indication of the quality of the electrical network, at least one of a rating or a premium associated with additional residential insurance coverage for the additional residential property, even when the additional residential property does not itself have an associated standby generator to supply backup power thereto.

Although insurance data determination system 100 is shown in FIG. 1 as including one instance of various components such as residential property 102, standby generator 104, computing device 106, remote computing device 108, vendor 112, etc., various aspects include insurance data determination system 100 implementing any suitable number of any of the components shown in FIG. 1 and/or any suitable additional component(s). Moreover, it should be appreciated that additional and/or alternative connections between components shown in FIG. 1 may be implemented. As just one example, insurance provider 110 and vendor 112 (e.g., (a) insurance provider computing device(s) 114 and/or insurance provider database(s) 116; and (b) vendor computing device(s) 118 and/or vendor database(s) 120) may be connected via a direct communication link (not shown in FIG. 1) instead of or in addition to via computer network 122.

Exemplary Data Indicative of Operational Condition of Standby Generator

Figure 2:
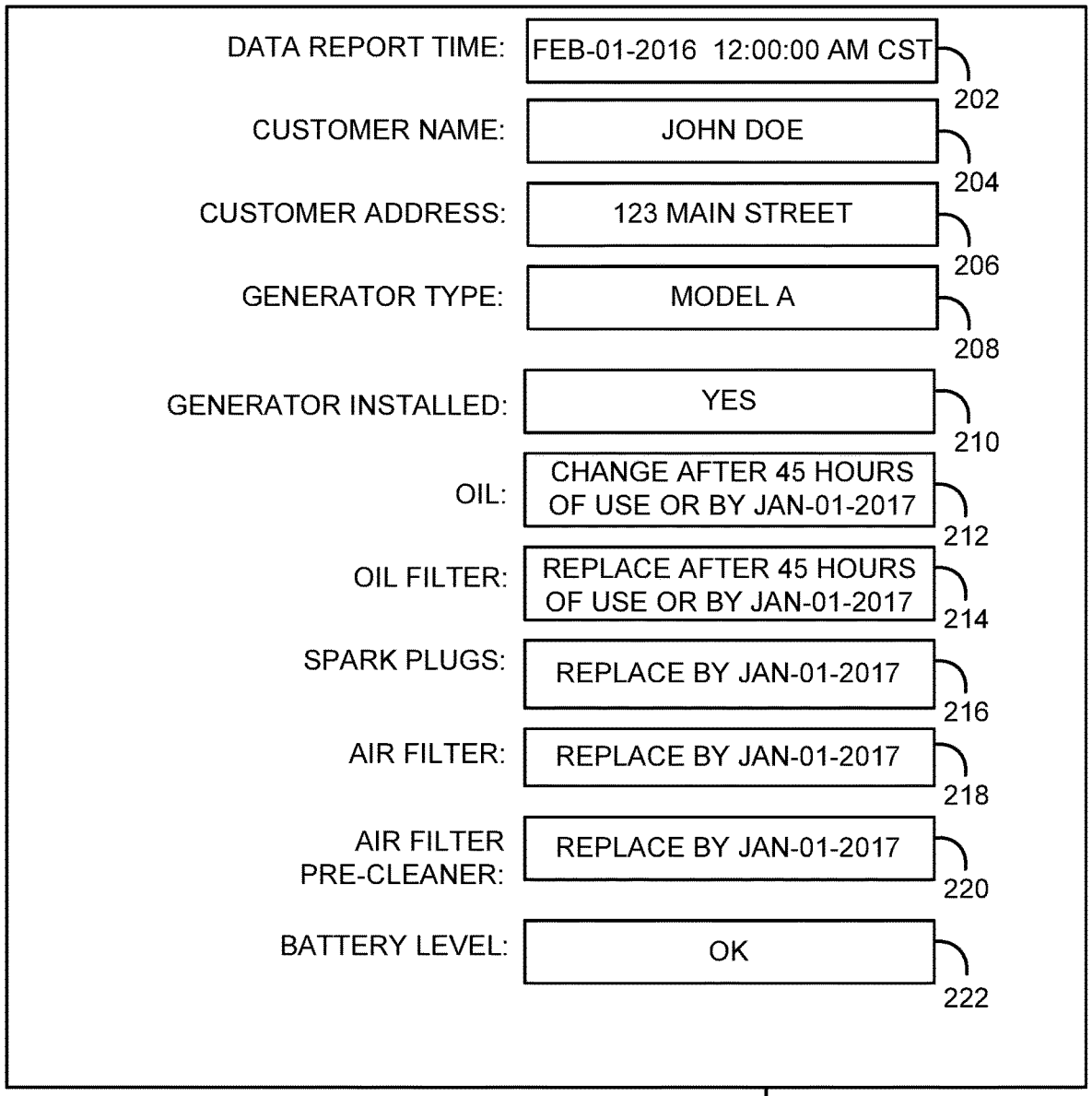
FIG. 2 illustrates an exemplary operational condition dataset 200 associated with a standby generator in accordance with an exemplary aspect of the present disclosure.

FIG. 2 illustrates an exemplary operational condition dataset 200 in accordance with an exemplary aspect of the present disclosure. It should be appreciated that the format and types of the data in operational condition dataset 200 are by way of example only, and that operational condition dataset 200 is an example representation of data indicative of the operational condition of standby generator 104. In one aspect, operational condition dataset 200 may include data elements (such as those illustrated in FIG. 2) that may be visible to a user of insurance provider computing device(s) 114 and/or to a user of vendor computing device(s) 118, such as via an appropriate display(s). In another aspect, operational condition dataset 200 may not be provided to or made visible to a user of insurance provider computing device(s) 114 or to a user of vendor computing device(s) 118, but may be representative of data received by insurance provider computing device(s) 114 and/or vendor computing device(s) 118 in order for insurance provider computing device(s) 114 to determine data associated with terms of residential insurance coverage. It should be appreciated that additional, fewer, or alternate formats and/or types of data may be included in the data indicative of the operational condition of standby generator 104, and thus in operational condition dataset 200 as well.

It should be further appreciated that because operational condition dataset 200 is, as noted above, an example representation of data indicative of the operational condition of standby generator 104, the data indicative of the operational condition of standby generator 104 need not exist in the format/arrangement shown in FIG. 2. That is, the data indicative of the operational condition of standby generator 104 need not exist as operational condition dataset 200 in the manner illustrated in FIG. 2. Operational condition dataset 200 is illustrated as a visual representation of what data may be included in the data indicative of the operational condition of standby generator 104, and it will be understood that operational condition dataset 200 as illustrated and described does not define or limit the actual type(s), format, and/or arrangement, or lack thereof, of the data indicative of the operational condition of standby generator 104.

In one aspect, as shown in FIG. 2, operational condition dataset 200 may include a data report time indication 202, customer name data 204, customer address data 206, generator type data 208, generator installation condition data 210, oil condition data 212, oil filter condition data 214, spark plug condition data 216, air filter condition data 218, air filter pre-cleaner condition data 220, and battery level condition data 222. In the illustrated example, data report time indication 202 may include a date and time corresponding to the remaining data indicative of the operational condition of standby generator 104 and included in operational condition dataset 200 (e.g., a date and time at which the data 212-222, for example, in operational condition dataset 200 is or was measured, collected, etc.).

In one aspect, customer (e.g., insured party) name data 204, customer address data 206, and/or generator type data 208 may be determined or received by vendor 112 at the time of purchase of standby generator 104 and/or installation of standby generator 104 at residential property 102. For instance, when the insured party decides to purchase standby generator 104, the insured party may contact vendor 112 for purchase and/or installation of standby generator 104. Vendor 112 may perform an assessment of residential property 102 (e.g., an in-home assessment), which as further discussed below may include consulting with the insured party regarding an amount of residential property 102 to which the insured party desires standby generator 104 to be configured to supply backup power. As a result of this assessment, vendor 112 may recommend and/or determine an appropriate size, type, and/or model of standby generator 104 and perform the installation accordingly. More particularly, as further discussed herein, size, type, and/or model of standby generator 104 may be determined based upon an amount of residential property 102 and/or a number of device(s)/element(s) of or associated with residential property 102 to which standby generator 104 is configured, or is to be configured, to supply backup power.

In this manner, vendor 112 may receive customer name data 204, customer address data 206, and/or generator type data 208 at the time of installation of standby generator 104. In another aspect, one or more of customer name data 204, customer address data 206, and/or generator type data 208 may be received by vendor 112 at, for example, vendor computing device(s) 118 (e.g., from standby generator 104, computing device 106, etc. via computer network 122). In one aspect, generator type data 208 may indicate a model, type, and/or size of standby generator 104.

In one aspect, generator installation condition data 210 may include an indication (e.g., a "YES" or "NO" indication) of whether standby generator 104 is installed at residential property 102. For example, the indication provided by generator installation condition data 210 may indicate whether standby generator 104 is, at the time generator installation condition data 210 is or was measured, collected, etc., configured to supply backup power to at least a portion of residential property 102 in the event of an outage of the main power supplied to residential property 102. In the example of FIG. 2, generator installation condition data 210 includes a "YES" indication, indicating that standby generator 104 is configured to supply such backup power at residential property 102. In one aspect, generator installation condition data 210 may be collected or measured a single time, such as by being recorded/collected by vendor 112 either at the time of installation of standby generator 104 at residential property 102 or by being received one time by vendor 112 (e.g., using vendor computing device(s) 118, such as via computer network 122) at or shortly after the time of installation of standby generator 104 at residential property 102. In another aspect, generator installation condition data 210 may be collected or measured periodically at any suitable intervals (e.g., regular intervals such as weekly, monthly, semiannual, etc. intervals), such as by being collected, measured, etc. by vendor 112 using vendor computing device(s) 118 (e.g., via computer network 122).

It should be appreciated that the data indicative of whether a standby generator is associated with residential property 102, as discussed herein, may be or may include generator installation condition data 210. In one aspect, the determination of the data associated with the terms of the residential insurance coverage as described herein may include determining that a more favorable rating and/or a lower premium is to be applied and/or charged for residential insurance coverage with respect to residential property 102 when generator installation condition data 210 indicates that standby generator 104 is configured to supply backup power to at least a portion of residential property 102. In some aspects, repeated indication by way of the aforementioned periodic collection, measurement, etc. of generator installation condition data 210 that standby generator 104 is configured to supply such backup power may result in an increasingly favorable rating and/or an increasingly lower premium in response to each such repeated indication.

In one aspect, oil condition data 212 may indicate an amount of time and/or use until oil of standby generator 104 needs to be changed, such as a need to change oil after 45 more hours of use of standby generator 104 to provide backup power or on Jan. 1, 2017 (e.g., whichever occurs first) in the example of FIG. 2. The aforementioned determination of the data associated with the terms of the residential insurance coverage may include, for example, determining a more favorable rating and/or a lower premium if the oil of standby generator 104 does not currently need to be changed, thus reflecting a decreased likelihood of loss and/or a decreased likely severity of loss as compared to an instance in which the oil of standby generator 104 needs to be changed. In other aspects, a more favorable rating and/or a lower premium may be determined if the oil does not need to be changed for at least a threshold amount of use and/or time; increasingly more favorable ratings and/or lower premiums may be determined corresponding to longer amounts of indicated time and/or use until the oil needs to be changed, etc.

In one aspect, oil filter condition data 214 may indicate an amount of time and/or use until an oil filter of standby generator 104 needs to be replaced, such as replacement after 45 more hours of use of standby generator 104 to provide backup power or on Jan. 1, 2017 (e.g., whichever occurs first) in the example of FIG. 2. Additionally, in an aspect, similar to the aforementioned effect of oil condition data 212 on the determination of the data associated with the terms of the residential insurance coverage, a rating (or ratings) and/or a premium (or premiums) may vary in favorability and/or amount depending upon whether the oil filter needs to be replaced, how much indicated time and/or use until the oil filter needs to be replaced, etc.

In various aspects, spark plug condition data 216, air filter condition data 218, and/or air filter pre-cleaner condition data 220 may indicate amounts of time and/or use until respective replacement(s) is/are needed, with amounts of time illustrated in the example of FIG. 2. More particularly, FIG. 2 shows an example replacement date of Jan. 1, 2017 for each of spark plugs of standby generator 104, an air filter of standby generator 104, and an air filter pre-cleaner of standby generator 104. It should be appreciated that the replacement dates shown in FIG. 2 are by way of example only and need not, for instance, be the same as one another. For instance, the replacement dates in FIG. 2 may in some aspects differ from one another as a result of different dates of installation of the corresponding components (e.g., the spark plugs, the air filter, the air filter pre-cleaner, etc.).

In one aspect, battery level condition data 222 may indicate whether a battery level of a battery of standby generator 104 is sufficient or needs to be increased (e.g., by charging or replacement of the battery). In the example illustrated in FIG. 2, battery level condition data 222 includes the data "OK" to indicate that the battery level of the battery of standby generator 104 is sufficient. The aforementioned determination of the data associated with the terms of the residential insurance coverage may include, for example, determining a more favorable rating and/or a lower premium if the battery level is indicated to be sufficient, thus reflecting a decreased likelihood of loss and/or a decreased likely severity of loss associated with residential property 102 as compared to an instance in which the battery level needs to be increased.

In one aspect, data other than data report time indication 202, customer name data 204, customer address data 206, and generator type data 208, and generator installation condition data 210 (e.g., data 212-222 described above, or any suitable portion thereof and/or additions thereto) may be collected or measured a single time, such as by being recorded/collected by vendor 112 either at the time of installation of standby generator 104 at residential property 102 or by being received one time by vendor 112 (e.g., using vendor computing device(s) 118, such as via computer network 122) at or shortly after the time of installation of standby generator 104 at residential property 102. In another aspect, data such as the data 212-222 may be collected or measured periodically at any suitable intervals (e.g., regular intervals such as weekly, monthly, semiannual, etc. intervals), such as by being collected, measured, etc. by vendor 112 using vendor computing device(s) 118 (e.g., via computer network 122) or by being collected, measured, etc. by smart home device 124. With reference to the discussion above, it should be appreciated that the data indicative of the operational condition of standby generator 104 may include data such as the data 212-222, for example. Additionally, in an aspect, repeated indications of favorable data within one or more of data 212-222 and/or improvements in data within one or more of data 212-222 over time may result in increasingly favorable rating(s) and/or premium(s).

In various aspects, standby generator 104 may be a "smart" standby generator or may otherwise be configured to periodically turn on or activate sufficient functionality of standby generator 104 in order to perform, generally speaking, self-monitoring that results in collection, measurement, etc. of any suitable data regarding standby generator 104, such as any one or more suitable and/or desired elements of operational condition dataset 200. In this manner, data may be periodically measured, collected, etc. as discussed above (e.g., collected by vendor 112, smart home device 124, and/or any other suitable device(s), etc.), and may be transmitted and utilized as also discussed herein. In some aspects, data regarding standby generator 104 (e.g., any suitable elements of operational conditional dataset 200) may also or alternatively be provided to the insured party (e.g., to computing device 106, remote computing device 108, smart home device 124, and/or any other suitable device(s), etc.). For instance, such data may be provided to the insured party as a real-time or near real-time data feed. In various aspects, such a real-time or near real-time data feed may be provided to the insured party: (1) with the same periodicity as any suitable and/or desired data in, for example, operational condition dataset 200 is provided to, for example, vendor 112 or smart home device 124; (2) when standby generator 104 turns on (e.g., begins supplying backup power to residential property 102); or (3) at any other suitable time or intervals of time, which may be selectable by the insured party.

In various aspects, with reference to the discussion above, including the discussion of several of the examples of data in operational condition dataset 200, adjustment of the data associated with the terms of the residential insurance coverage may be performed (e.g., by the processor(s) of insurance provider computing device(s) 114) in response to changes in one or more elements of operational condition dataset 200. In some aspects, generally speaking, changes in operational condition dataset 200 that indicate reduced short-term and/or long-term reliability of standby generator 104, and/or changes that indicate reduced diligence of an insured party with respect to maintenance of standby generator 104, may result in adjustment of a rating to be less favorable and/or adjustment of a premium to be higher. Conversely, in other aspects, generally speaking, changes in operational condition dataset 200 that indicate increased short-term and/or long-term reliability of standby generator 104, and/or changes that indicate increased diligence of an insured party with respect to maintenance of standby generator 104, may result in adjustment of a rating to be more favorable and/or adjustment of a premium to be lower.

Figure 3:
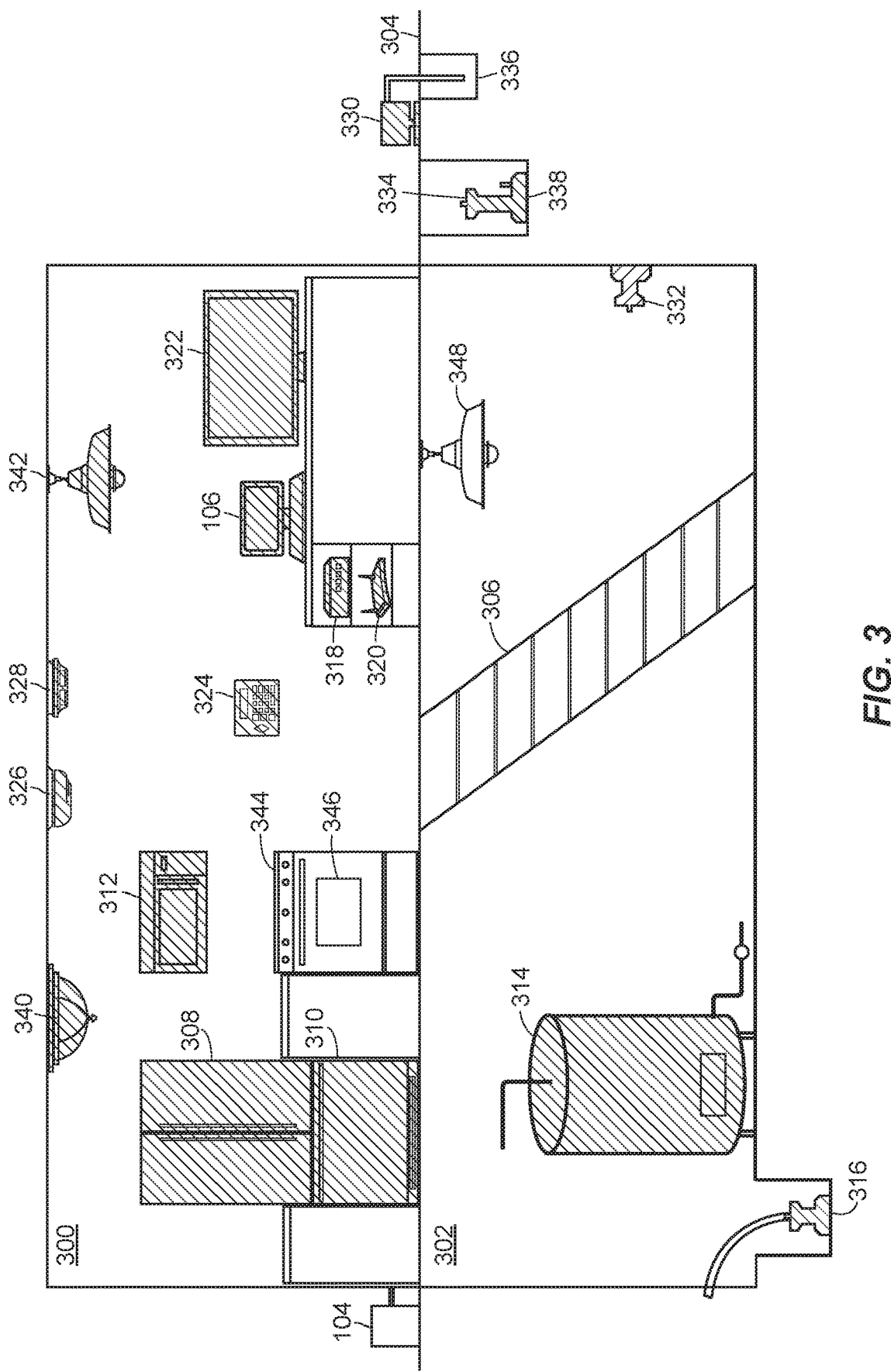
FIG. 3 illustrates an exemplary simplified two-dimensional diagram of residential property and an exemplary configuration of a standby generator to supply power to portions of the residential property in accordance with an exemplary aspect of the present disclosure.

Exemplary Configuration of Standby Generator to Supply Power to Residential Property FIG. 3 illustrates an exemplary simplified two-dimensional diagram of residential property 102 and an exemplary configuration of standby generator 104 to supply power to portions thereof. It should be appreciated that the various devices of and associated with (e.g., outside of) residential property 102 illustrated in FIG. 3 are by way of example only, and that additional, fewer, or alternate devices of residential property 102 may be implemented, with standby generator 104 configured to supply power to any desired device(s) and/or portion(s) of residential property 102. In some instances, standby generator 104 may be configured to supply power to all of residential property 102 in the event of an outage of the main power supplied to residential property 102.

More particularly, the example of FIG. 3 is a simplified two-dimensional diagram of the interior of residential property 102 and of various devices/elements outside of residential property 102, including standby generator 104. As such, in FIG. 3, residential property 102 is not numbered as such, and is instead shown with a first floor 300 and a basement 302 as viewed from a front side of residential property 102. FIG. 3 also illustrates a ground 304 aligned with the separation of first floor 300 from basement 302. FIG. 3 further illustrates a staircase 306 connecting first floor 300 and basement 302, as well as several devices/elements outside of residential property 102, as further discussed below.

In the example of FIG. 3, devices of residential property 102 to which standby generator 104 is configured to supply power are shown with cross hatching. For instance, as noted above, an insured party associated with residential property 102 (e.g., a homeowner) may contact vendor 112 for purchase and/or installation of standby generator 104, and may specify devices and/or portions of residential property 102 to which the insured party desires to have power supplied from standby generator 104 in the event of an outage of the main power to residential property 102. In one aspect, vendor 112 may provide standby generator 104 such that standby generator 104 is of an appropriate size and/or type based upon the devices and/or portions desired to have such backup power supplied, and vendor 112 may configure standby generator 104 to supply backup power accordingly. Standby generator 104 is illustrated as being connected to residential property 102 (e.g., to an outside of first floor 300), with further details of the configuration of standby generator 104 such as further wiring, etc., not being shown in FIG. 3 for simplicity of illustration.

In one aspect, standby generator 104 may be configured to supply power to kitchen appliances, such as a refrigerator 308, a freezer 310, and a microwave oven 312. Standby generator 104 may also be configured to supply power to a heating element 314, such as a furnace as shown in FIG. 3. In another aspect, heating element 314 may be a boiler, for example. Standby generator 104 may also be configured to supply power to a sump pump 316; one or more electronic devices such as, for instance, computing device 106, a modem 318, a router 320, and/or a television 322; and/or one or more home security devices such as a home security and monitoring system 324. Standby generator 104 may further be configured to supply power to one or more life safety devices such as a carbon monoxide detector 326 and/or a smoke detector 328. Standby generator 104 may still further be configured to supply power to one or more of a water well pump 330, a sewage pump 332, and/or a septic pump 334 (e.g., an effluent pump), where water well pump 330 is illustrated in FIG. 3 with a corresponding water well 336 and septic pump 334 is illustrated with a corresponding tank 338. Furthermore, standby generator 104 may be configured to supply power to one or more lighting elements (e.g., light fixtures, lamps, etc.), such as a first light fixture 340 and a second light fixture 342. FIG. 3 shows an example where standby generator 104 is configured to supply power to each of the aforementioned devices/elements 106, 308-334, 340, and 342, and thus each of devices/elements 106, 308-334, 340, and 342 are shown with cross hatching.

Among other advantages, in examples such as that shown in FIG. 3 where standby generator 104 is configured to supply power to refrigerator 308, freezer 310, and microwave oven 312, at least some food in residential property 102 before an outage of the main power supplied thereto may continue to be stored without spoiling and cooked using microwave oven 312. Food spoilage claims, which may, depending upon insurance policy terms, be covered by the residential insurance coverage provided for residential property 102, may thus be reduced or avoided. Additionally, where standby generator 104 is configured to supply power to heating element 314, loss such as water damage that may occur due to freezing of pipes may be reduced or avoided. Where standby generator 104 is configured to supply power to sump pump 316, loss such as water damage that may occur due to water backup in basement 302 may be reduced or avoided. Where standby generator 104 is configured to supply power to computing device 106, modem 318, router 320, and television 322, loss due to damage from brownouts may be reduced or avoided, at least in situations where standby generator 104 is of a type that begins to supply backup power before a complete outage of the main power supplied to residential property 102 (e.g., of a type that begins to supply backup power when a brownout occurs, without the need for total loss of main power, thus reducing or avoiding damage to electronic devices from a brownout). An indication of a type of standby generator 104 is further discussed herein with respect to, for instance, generator type data 208.

Moreover, where standby generator 104 is configured to supply power to home security and monitoring system 324, home security and monitoring system 324 may remain in an operational mode and continue to communicate data (e.g., to local police and/or fire departments, to a mobile device(s) of an insured party associated with residential property 102, etc.) after an outage of main power supplied to residential property 102. Additionally, in some aspects, in order to communicate with a mobile device(s) of an insured party and/or local police and/or fire departments, etc., home security and monitoring system 324 may need Internet connectivity. In such aspects, where standby generator 104 is configured to supply power to modem 318 and router 320, such Internet connectivity may be preserved in the event of an outage of the main power supplied to residential property 102.

Still further, where standby generator 104 is configured to supply power to life safety devices such as carbon monoxide detector 326 and smoke detector 328, functioning of such life safety devices may be preserved as contrasted with an absence of backup power from standby generator 104, which may cause such life safety devices to cease functioning after the amount of time that backup batteries will power such life safety devices. Additionally, where standby generator 104 is configured to supply power to water well pump 330, the ability to cook food, clean cookware, and generally continue residing in residential property 102 during the outage of the main power supplied thereto may be preserved, thus avoiding a claim of loss or reducing the severity of such a claim. The ability to continue residing in residential property 102 during the outage of the main power supplied thereto may also be preserved where standby generator 104 is configured to supply power to sewage pump 332 and septic pump 334. Furthermore, where standby generator 104 is configured to supply power to one or more light fixtures, lamps, etc., such as first and second light fixtures 340 and 342 of FIG. 3, a risk of accident and/or personal injury in residential property 102 may be reduced, among other advantages, thus reducing the likelihood of a claim of loss and the likely severity of such a claim.

It should be appreciated that in each of the aforementioned examples, the configuration of standby generator 104 to supply backup power to the device(s)/element(s) noted may avoid risk of loss that will result in a claim under the residential insurance coverage for residential insurance property 102, or reduce the severity of such a loss and resulting claim. As further discussed herein, insurance provider 110 may receive (e.g., at insurance provider computing device(s) 114) data indicative of an operational condition of standby generator 104 (e.g., operational condition dataset 200, etc.) and/or data indicative of an amount of residential property 102 to which standby generator 104 is configured to supply power (e.g., data indicative of the device(s)/element(s) to which standby generator 104 is configured to supply power). As also discussed herein, such data may be received more than once (e.g., periodically) so that a rating(s) and/or a premium(s) associated with the residential insurance coverage may be adjusted over time to reflect changes in the operational condition of standby generator 104 and/or the amount of residential property 102 to which standby generator 104 is configured to supply power.

In the example of FIG. 3, standby generator 104 may not be configured to supply power to other devices in the event of an outage of the main power supplied to residential property 102, such as a stove 344, a conventional oven 346, and a third light fixture 348. For instance, the insured party may elect not to have standby generator 104 configured to supply backup power to stove 344, conventional oven 346, and third light fixture 348 in order to reduce purchasing, installation, and/or maintenance costs associated with standby generator 104. Such a decision by the insured party may also be motivated by a consideration that stove 344, conventional oven 346, and third light fixture 348 may be less important to have powered in the event of an outage of the main power supplied to residential property 102. As such, in the example of FIG. 3, stove 344, conventional oven 346, and third light fixture 348 are not shown with cross hatching. It should be appreciated, however, that standby generator 104 may be configured to supply backup power to any suitable device(s)/element(s)/etc. of or associated with residential property 102 in the event of an outage of the main power, and that the data associated with the terms of the residential insurance coverage may be determined and/or adjusted based upon the device(s)/element(s)/etc. to which standby generator 104 is configured to supply backup power. Determination and/or adjustment of the data associated with the terms of the residential insurance coverage is discussed in greater detail below.

Exemplary Data Associated with Standby Generator

Figure 4:
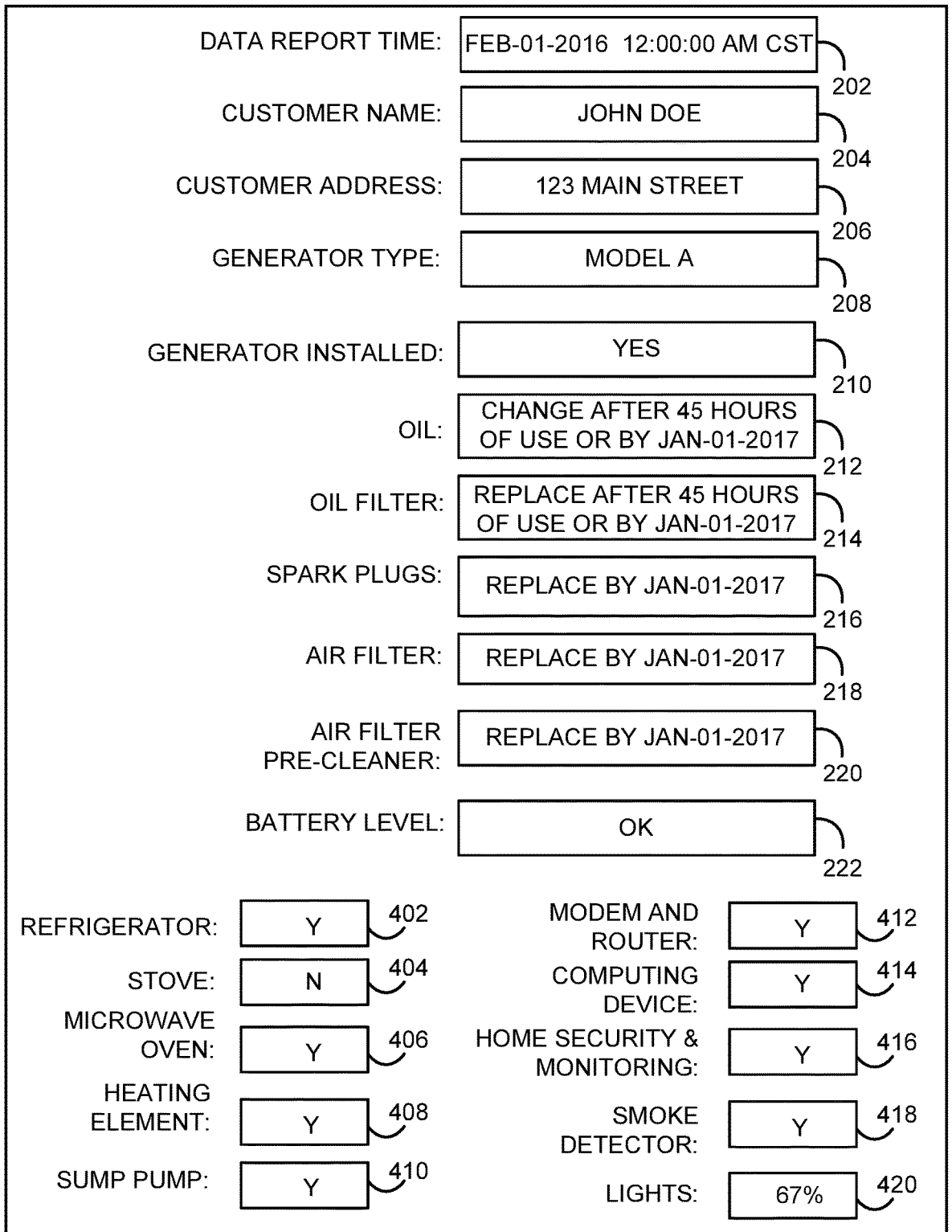
FIG. 4 illustrates an exemplary standby generator dataset 400 associated with a standby generator in accordance with an exemplary aspect of the present disclosure.

FIG. 4 illustrates an exemplary standby generator dataset 400 including data associated with standby generator 104, in accordance with an exemplary aspect of the present disclosure. Standby generator dataset 400 is illustrated as including all of the data included in operational condition dataset 200, and as including additional data that is further discussed herein. Depending upon the amount and/or types of data regarding standby generator 104 that are received by insurance provider 110 (e.g., depending upon whether insurance provider 110 receives data indicative of an amount of residential property 102 to which standby generator 104 is configured to supply power), insurance provider 110 may, in an aspect, receive one of operational condition dataset 200 or standby generator dataset 400.

Additionally, it should be appreciated that the format and types of data in standby generator dataset 400 are by way of example only. Moreover, as with operational condition dataset 200, it should be appreciated that the format and types of data in standby generator dataset 400 are an example representation of data that may be associated with standby generator 104 and received by, for instance, smart home device 124 or vendor 112, and received by insurance provider 110 from smart home device 124 or vendor 112. Thus, standby generator dataset 400 may include data elements that may be visible to a user of insurance provider computing device(s) 114 and/or to a user of vendor computing device(s) 118. In another aspect, however, standby generator dataset 400 may not be provided to or made visible to a user of insurance provider computing device(s) 114 or to a user of vendor computing device(s) 118. Thus, as in the situation where operational condition dataset 200 is not provided to or made visible to such a user, standby generator dataset 400 as illustrated in FIG. 4 may be a representation of data received by insurance provider computing device(s) 114 and/or vendor computing device(s) 118 in order for insurance provider computing device(s) 114 to determine data associated with terms of residential insurance coverage.

In another aspect, standby generator dataset 400 may be received by insurance provider 110 from the insured party associated with residential property 102, such as at an office of insurance provider 110. It should also be appreciated that additional, fewer, or alternate formats and/or types of data may be included in standby generator dataset 400. For instance, standby generator dataset 400 may in some aspects not include all of the data included in operational condition dataset 200. It should be further appreciated that because standby generator dataset 400 is, as noted above, an example representation of data that may be associated with standby generator 104, data associated with standby generator 104 need not exist in the format or arrangement shown in FIG. 4. That is, data associated with standby generator 104 need not exist as standby generator dataset 400 in the manner illustrated in FIG. 4. Standby generator dataset 400 is illustrated as a visual representation of what data may be included in data associated with standby generator 104, and it will be understood that standby generator dataset 400 as illustrated and described does not define or limit the actual type(s), format, and/or arrangement, or lack thereof, of data associated with standby generator 104.

In various aspects, standby generator dataset 400 may include, in addition to the data included in operational condition dataset 200, indications of whether standby generator 104 is configured to supply power to various device(s)/element(s) of residential property 102, and/or indications of an amount, percentage, and/or fraction of various device(s)/element(s) of residential property 102 to which standby generator 104 is configured to supply power. For instance, as shown in the example of FIG. 4, standby generator dataset 400 may include: (a) a refrigerator power indication 402 indicative of whether standby generator 104 is configured to supply power to a refrigerator, such as refrigerator 308; (b) a stove power indication 404 indicative of whether standby generator 104 is configured to supply power to a stove, such as stove 344; (c) a microwave oven power indication 406 indicative of whether standby generator 104 is configured to supply power to a microwave oven, such as microwave oven 312; (d) a heating element power indication 408 indicative of whether standby generator 104 is configured to supply power to a heating element, such as heating element 314; (e) a sump pump power indication 410 indicative of whether standby generator 104 is configured to supply power to a sump pump, such as sump pump 316; (f) a modem and router power indication 412 indicative of whether standby generator 104 is configured to supply power to a modem and a router, such as modem 318 and router 320; (g) a computing device power indication 414 indicative of whether standby generator 104 is configured to supply power to a computing device, such as computing device 106; (h) a home security and monitoring power indication 416 indicative of whether standby generator 104 is configured to supply power to a home security and/or monitoring device or system, such as home security and monitoring system 324; (i) a smoke detector power indication 418 indicative of whether standby generator 104 is configured to supply power to a smoke detector, such as smoke detector 328; and (j) a lights power indication 420 indicative of, for instance, a percentage of light fixtures of residential property 102 to which standby generator 104 is configured to supply power.

In the example of FIG. 4, the indications 402 and 406-418 are each shown as "Y" to indicate that standby generator 104 is configured to supply power to the corresponding device(s)/element(s), consistent with the device(s)/element(s) which standby generator 104 is shown as being configured to supply power to in FIG. 3. In the example of FIG. 4, the indication 404 is shown as "N" to indicate that standby generator 104 is not configured to supply power to stove 344, consistent with the example of FIG. 3. Furthermore, in the example of FIG. 4, the lights power indication 420 is shown as "67%" consistent with the example of FIG. 3, in which standby generator 104 is configured to supply light to first and second light fixtures 340 and 342, but not to third light fixture 348 (thus, FIG. 4 reflects that standby generator 104 is, in the example of FIG. 3, configured to supply power to approximately 67% of the light fixtures of residential property 102).

With reference to the discussion above, in one aspect, the data in standby generator dataset 400 may be received by, for instance, smart home device 124 or vendor 112 and by insurance provider 110 from smart home device 124 or vendor 112. With further reference to the discussion above, in an aspect, some or all of the data in standby generator dataset 400 may be received by vendor 112 at the time of installation of standby generator 104 at residential property 102 (e.g., customer name data 204, customer address data 206, and/or generator type data 208, other suitable data in standby generator dataset 400, and/or any other suitable data, etc.). For instance, such data may be received by a representative (e.g., employee or contractor) of vendor 112 who performs an in-home assessment and performs the installation of standby generator 104.

Other data in standby generator dataset 400 may also be received by vendor 112 at the time of installation, such as by also being received by the representative of vendor 112. For instance, in one aspect, the in-home assessment and installation of standby generator 104 may include consultation with the insured party regarding the device(s)/element(s) of residential property 102 to which the insured party desires to have standby generator 104 configured to supply backup power. Data 402-420 may correspondingly be received/collected by the representative of vendor 112 at the time of installation, may be provided to insurance provider 110 by vendor 112, and may be assumed by vendor 112 and insurance provider 110 to remain unchanged unless, for instance, the insured party provides an update to any of the data 402-420 to vendor 112 and/or insurance provider 110.

In another aspect, an update(s) to any of the data 402-420 may be received one time or periodically by standby generator providing standby generator dataset 400 or a portion thereof to, for instance, smart home device 124 or vendor 112, and smart home device 124 or vendor 112 may provide such data to insurance provider 110. It should be appreciated that a real-time or near real-time data feed to the insured party (e.g., to computing device 106, remote computing device 108, etc.) as described elsewhere herein may include all or a portion of data indicative of an amount of residential property 102 to which standby generator 104 is configured to supply power, and/or may include any updates to such data. As such, the real-time or near real-time data feed to the insured party may include all or a portion of data 402-420 (e.g., as of the time of installation of standby generator 104 by vendor 112) and/or updates to data 402-420.

In another aspect, other data in standby generator dataset 400, such as data 210-222, may also or alternatively be received a single time or periodically by, for instance, smart home device 124, vendor computing device(s) 118, and/or insurance provider computing device(s) 114 as noted above. For instance, such other data may be received by smart home device 124 or by vendor computing device(s) 118, and may then be received by insurance provider computing device(s) 114 when the insured party consents to insurance provider 110 receiving data in such a manner. Such other data (e.g., data 210-222), and/or data such as all or any portion of the data 402-420, may in another aspect be provided by the insured party to insurance provider 114 a single time or periodically, such as when the insured party does not consent to smart home device 124 or vendor 112 providing such data to insurance provider 110.

In one aspect, standby generator dataset 400 (or operational condition dataset 200 and/or any suitable data regarding standby generator 104) may be received by vendor 112 (e.g., vendor computing device(s) 118) and made available for receipt by insurance provider computing device(s) 114 via a web portal. In another aspect, standby generator dataset 400 or other suitable data regarding standby generator 104 may be provided in a data file transmitted from vendor 112 (e.g., vendor computing device(s) 118) to insurance provider 110 (e.g., insurance provider computing device(s) 114), or accessed by insurance provider 110 from vendor 112, either directly or via computer network 122. In one embodiment, such a data file may be accessed by insurance provider computing device(s) 114 from vendor database(s) 120. In another embodiment, such a data file may be an attachment to a message (e.g., e-mail message or other suitable message) from vendor computing device(s) 118 to insurance provider computing device(s) 114. In some aspects, such a data file may be in the form of a certificate that provides a certification from vendor 112 (or in some cases smart home device 124) that the data contained therein is an accurate representation, or the most recent available representation, of the customer (e.g., insured party) information associated with standby generator 104, the association of standby generator 104 with residential property 102, the operational condition of standby generator 104, and/or the device(s)/element(s) configured to be powered by standby generator 104, etc. Such a certificate may be transmitted to or accessed by insurance provider 110 in any suitable manner, including any of the example manners discussed above.

In aspects where data regarding standby generator 104 is provided to insurance provider 110 from the insured party, the data may be provided as, for instance, printed material (e.g., a printed version of the aforementioned certificate). Such printed material may include, for instance, customer information associated with standby generator 104, data indicative of the association of standby generator 104 with residential property 102, data indicative of the operational condition of standby generator 104, and/or data indicative of an amount of residential property 102 to which standby generator 104 is configured to supply power, etc. Such a certificate, printed material, or other suitable verification may be obtained by the insured party from vendor 112, or in some cases via smart home device 124 and another suitable device(s) in communication with smart home device 124, such as computing device 106.

It should be appreciated that more complex and/or additional data may be included in standby generator dataset 400, such as more complex and/or additional data associated with data 402-420, and that the examples shown in FIG. 4 are for ease of explanation and illustration. For instance, in one aspect, refrigerator power indication 402 may provide additional data beyond a "yes or no" indication of the type illustrated, such as data regarding a location and size of a refrigerator (e.g., refrigerator 308) (e.g., whether refrigerator 308 is a large refrigerator located in a kitchen or a smaller refrigerator located in basement 302). In another aspect, refrigerator power indication 402 may also or alternatively provide additional data such as data indicative of a total number of refrigerators of residential property 102, respective locations of each refrigerator, and a "yes or no" indication of whether standby generator 104 is configured to supply power to each respective refrigerator. Generally speaking, refrigerator power indication 402 may include any desired and suitable additional or alternative data other than that shown in FIG. 4. Similarly, data in standby generator dataset 400 may also include any desired and suitable additional or alternative data other than data 404-420 shown in FIG. 4.

Furthermore, additional device(s)/element(s) of or associated with residential property 102 may have corresponding data/indication(s) in standby generator dataset 400. Still further, standby generator dataset 400 may in some aspects include additional data (not shown in FIG. 4) indicative of a fraction, percentage, etc. of residential property 102 to which standby generator 104 is configured to supply power; a fraction, percentage, etc. of device(s)/element(s) of residential property 102 to which standby generator 104 is configured to supply power; and/or any other suitable fraction(s), percentage(s), etc. indicative of an amount of residential property 102 to which standby generator 104 is configured to supply power.

As further discussed herein, the data in standby generator dataset 400 may be received/accessed by insurance provider 110 and may be used to determine and/or adjust the data associated with the terms of the residential insurance coverage. More particularly, with reference to the discussion of data in operational condition dataset 200 that is also shown as being included in standby generator dataset 400, data included in standby generator dataset 400 may be indicative of whether standby generator 104 is associated with (e.g., installed at) residential property 102.

Data included in standby generator dataset 400 may further be indicative of an operational condition of standby generator 104. The data associated with the terms of the residential insurance coverage may be determined and/or adjusted based upon such data. As shown and discussed with respect to the example of FIG. 4, standby generator dataset 400 may further include data indicative of an amount of residential property 102 to which standby generator 104 is configured to supply power. As further described herein, in some aspects, a determination and/or adjustment of the data associated with the terms of the residential insurance coverage may be further based upon such data indicative of the amount of the residential property 102 to which standby generator 104 is configured to supply power.

Figure 5:
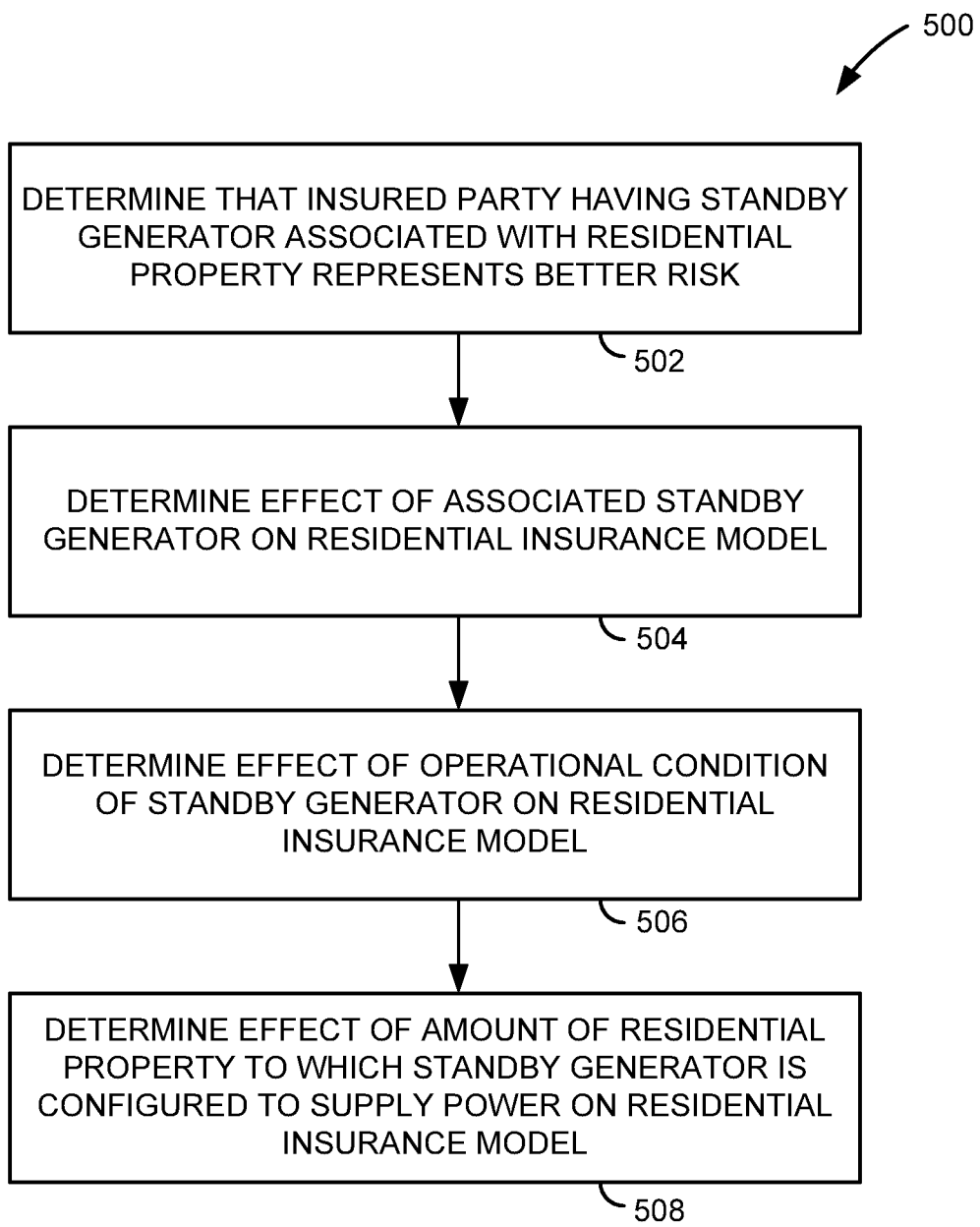
FIG. 5 illustrates an exemplary computer-implemented method 500 of determining a residential insurance model based upon an associated standby generator in accordance with an exemplary aspect of the present disclosure.

Exemplary Determining of Residential Insurance Model Based Upon Associated Standby Generator FIG. 5 illustrates an exemplary method 500 of determining a residential insurance model based upon an associated standby generator. More particularly, the residential insurance model may be determined based upon an analysis (or analyses) finding that an insured party having a standby generator represents a better risk profile for insurance provider 110 providing residential insurance coverage as compared to an insured party without a standby generator. In one aspect, the residential insurance model may be a pricing model, such as a discount model, that leverages data associated with a standby generator, such as standby generator dataset 400 associated with standby generator 104. In one aspect, the method 500 may be implemented by the insurance provider computing device(s) 114. For instance, the method 500 may be performed by one or more processors, applications, and/or routines that are part of, stored by, and/or otherwise accessible to insurance provider computing device(s) 114.

The method 500 may include determining that an insured party having a standby generator (e.g., standby generator 104) associated with (e.g., installed at) residential property (e.g., residential property 102) for which the insured party has or desires to obtain residential insurance coverage represents a better risk for an insurance provider (e.g., insurance provider 110) (block 502). More particularly, the method 500 may include determining that such an insured party represents a better risk profile for insurance provider 110 as compared to another insured party that does not have a standby generator associated with residential property for which the other insured party has or desires to obtain residential insurance coverage (block 502).

In one aspect, the determination described with respect to block 502 may be a generally applicable determination, e.g., a determination which is not unique to one insured party but which is a determination that, as a general matter, an insured party (e.g., any insured party) having a standby generator associated with residential property represents a better risk. As such, the further determinations described herein with respect to a residential insurance model may be made in order to apply such a residential insurance model (e.g., discount model) to any insured party that has a standby generator associated with residential property that is, or that is to be, covered by residential insurance coverage.

In one aspect, the determination described with respect to block 502 may be performed based upon analyzing de-identified data from both insurance provider 110 and a vendor of standby generators (e.g., vendor 112). For instance, insurance provider 110 may provide claims data regarding claims made by insured parties having residential insurance coverage to a third party, and vendor 112 may provide data to the same third party indicating (e.g., identifying) customers of vendor 112 who have purchased standby generators that have been installed in their homes. The third party may then match data indicating customers of vendor 112 and claims data provided by insurance provider 110 using, for example, names and/or addresses included in the data indicating customers of vendor 112 and included in the claims data so that, for instance, each claim is matched with an indication of whether the named insured party has an installed standby generator from vendor 112. In some cases, more than one vendor may provide data to the third party indicating customers who have purchased standby generators, and data from such multiple vendors may be matched with the claims data provided by insurance provider 110.

The matched data may then be de-identified so that insurance provider 110 does not have access to personally identifiable information of customers of vendor 112, and the matched, de-identified data may be sent to insurance provider 110. Insurance provider 110 may analyze the matched, de-identified data to make the determination that, as a general matter, insured parties with standby generators associated with residential property 110 represent a better risk to insurance provider 110 than insured parties without standby generators (block 502). For instance, and referring to the discussion elsewhere herein, it may be determined that insured parties with standby generators represent a better risk to insurance provider 110 because the installation of a standby generator (e.g., standby generator 104) may avoid some losses entirely, and/or reduce the severity of losses, depending upon factors such as standby generator type, which device(s)/element(s) of residential property 102 are configured to receive power from standby generator 104, etc. (block 502). Such an analysis and resulting determination may include, for example, any suitable technique(s) for identifying a correlation between having a standby generator installed at residential property of an insured party and lower frequency and/or severity of loss (block 502).

The method 500 may include determining an effect on the residential insurance model of an insured party having a standby generator (e.g., standby generator 104) associated with (e.g., installed at) residential property (e.g., residential property 102) for which residential insurance coverage is provided (block 504). For instance, one or more discount amounts, percentages, etc. may be determined as being applicable to an insured party that has a standby generator (e.g., standby generator 104), with such discount amounts, percentages, etc. varying in the residential insurance model depending upon any suitable factors (block 504). In one aspect, a discount amount, percentage, etc. may vary for an insured party having standby generator 104 based upon one or more factors such as whether repeated indications that standby generator 104 is associated with residential property 102 have been received (as discussed elsewhere herein); a ZIP code of residential property 102; a size of residential property 102; an age of residential property 102; a claims history of insured party with respect to residential property 102; claims histories of geographically close insured parties that also have residential insurance coverage with respect to their residential properties through insurance provider 110; and/or any other suitable factor(s) (block 504).

The method 500 may include determining an effect on the residential insurance model of an operational condition of standby generator 104 (block 506). In one aspect, as discussed elsewhere herein, data indicative of the operational condition of standby generator 104 may be received by insurance provider 110 by receiving one or more of the types of data in operational condition dataset 200, and/or any other suitable data indicative of the operational condition of standby generator 104. The determination described with respect to block 506 may include determining one or more discount amounts, percentages, etc. for use as part of the residential insurance model, which amounts, percentages, etc. may vary based upon any suitable factors (block 506). In an aspect, a discount amount, percentage, etc. may vary for an insured party having standby generator 104 based upon one or more factors such as how recently the data indicative of the operational condition was last received; how frequently the data indicative of the operational condition is received; how many and/or which elements of the data indicative of the operational condition indicate that standby generator 104 is in acceptable working order; how close one or more elements of the data indicative of the operational condition are to no longer being within an acceptable range, of an acceptable value, etc.; and/or any other suitable factor(s) (block 506).

The method 500 may include determining an effect on the residential insurance model of an amount of residential property 102 to which standby generator 104 is configured to supply power (block 508). Data indicative of an amount of residential property 102 to which standby generator 104 is configured to supply power may be received in any suitable manner, such as in one of the example ways described above, and may include any suitable data such as, for instance, types of data within standby generator dataset 400. The determination described with respect to block 508 may include determining one or more discount amounts, percentages, etc. for use as part of the residential insurance model, which amounts, percentages, etc. may vary based upon any suitable factors (block 508). In one aspect, a discount amount, percentage, etc. may vary for an insured party having standby generator 104 based upon one or more factors such as a fraction, percentage, etc. of residential property to which standby generator 104 is configured to supply power; particular device(s)/element(s) and/or type(s) of device(s)/element(s) of or associated with residential property 102 to which standby generator 104 is configured to supply power; climate in a geographical region of residential property 102 in conjunction with particular device(s)/element(s) to which standby generator 104 is configured to supply power (e.g., to account for greater risk of burst pipes when residential property 102 is in a region of relatively cold climate and standby generator 104 is not configured to supply backup power to heating element 314, etc.); how recently the data indicative of the amount of residential property 102 to which standby generator 104 is configured to supply power was last received; how frequently the data indicative of the amount of residential property 102 to which standby generator 104 is configured to supply power is received (e.g., so as to account for any changes in such data); and/or any other suitable factor(s) (block 508).

By performing the determinations discussed with respect to the method 500, a residential insurance model that accounts for whether a standby generator (e.g., standby generator 104) is associated with residential property 102; an operational condition of standby generator 104; an amount of residential property 102 to which standby generator 104 is configured to supply power; updates to such data; and/or any other suitable data may be determined. More particularly, as described herein, discount amounts, percentages, etc. may be determined that account for such data. Such discount amounts, percentages, etc. may then be applied in determining data associated with terms of residential insurance coverage (e.g., a premium(s)), as further described herein with respect to, for instance, FIG. 6. It should be appreciated that the residential insurance model, or another residential insurance model, may similarly indicate one or more rating changes (e.g., a rating improvement(s) and/or an unfavorable rating change(s)) for residential insurance coverage, such as one or more rating changes based upon factors the same as or similar to those discussed with respect to blocks 504, 506, and/or 508. It should be further appreciated that the determination of the residential insurance model(s) as described herein may include determining parameters such as discount amount(s), percentage(s), rating change(s), etc. that may be applied in determining any suitable data associated with terms of residential insurance coverage, which data may include but need not be limited to a premium(s) and/or a rating(s).

The method 500 may include additional, less, or alternate actions, including those discussed elsewhere herein, and/or may be implemented via an appropriate computing device(s) and/or processors thereof (e.g., insurance provider computing device(s) 114), or via computer-executable instructions stored on non-transitory computer-readable medium or media.

Figure 6:
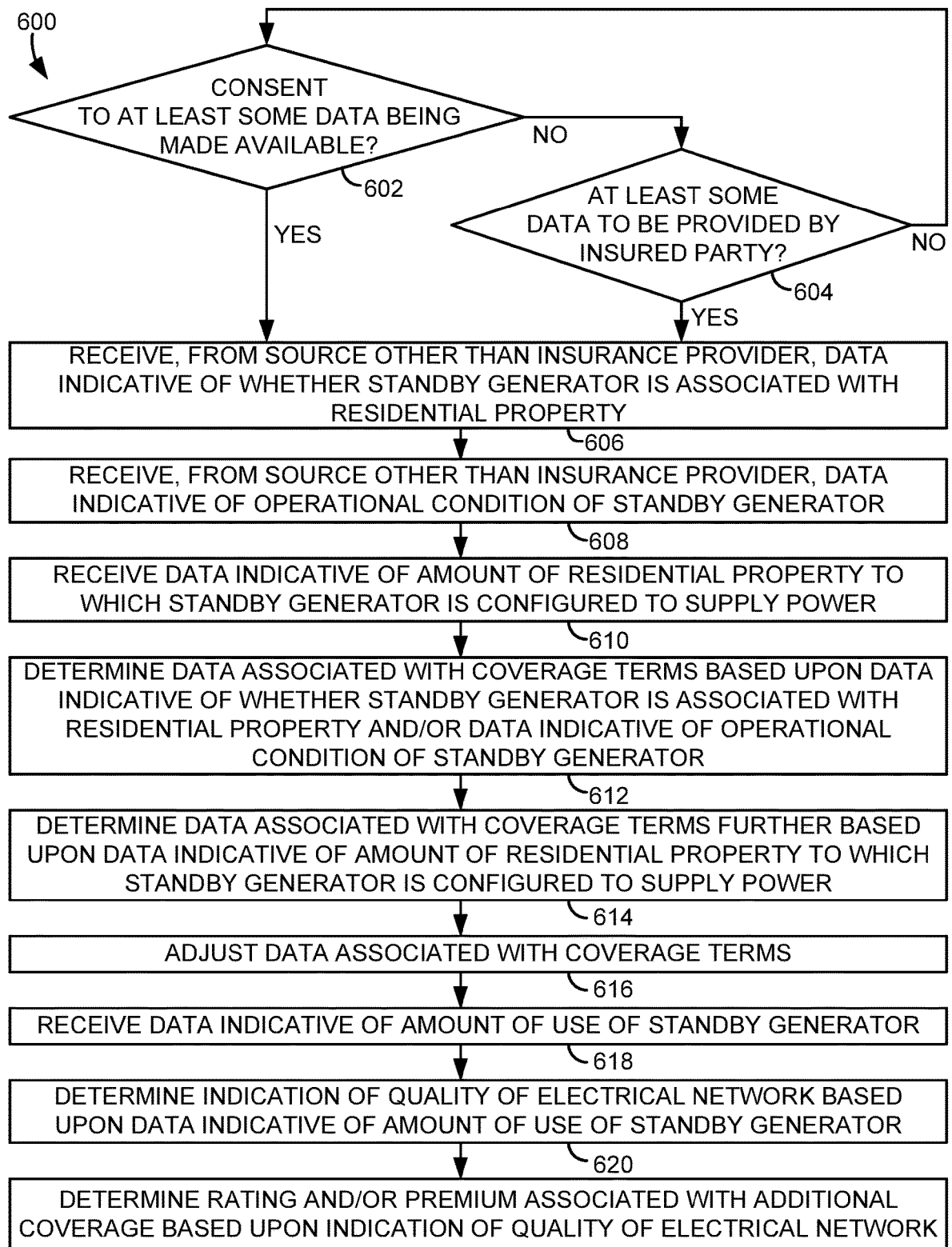
FIG. 6 illustrates an exemplary computer-implemented method 600 of using standby generator data to determine data associated with terms of residential insurance coverage in accordance with an exemplary aspect of the present disclosure.

Exemplary Determining of Data Associated with Terms of Residential Insurance Coverage FIG. 6 illustrates an exemplary method 600 of using standby generator data to determine data associated with terms of residential insurance coverage. In one aspect, the method 600 may be implemented by the insurance provider computing device(s) 114. For instance, the method 600 may be performed by one or more processors, applications, and/or routines that are part of, stored by, and/or otherwise accessible to insurance provider computing device(s) 114.

The method 600 may include determining whether an insured party associated with residential property (e.g., a homeowner of residential property 102, condominium association board of residential property 102, etc.) has consented to at least some data regarding a standby generator (e.g., standby generator 104) being made available to an insurance provider (e.g., insurance provider 110) (block 602).

In one aspect, the determination described with respect to block 602 may include determining whether the insured party has consented to at least data indicative of whether a standby generator (e.g., standby generator 104) is associated with residential property 102 being made available to insurance provider 110. In one embodiment, the determination described with respect to block 602 may also or alternatively include determining whether the insured party has consented to one or more of data indicative of an operational condition of standby generator 104 being made available to insurance provider 110 and/or data indicative of an amount of residential property 102 to which standby generator 104 is configured to supply power being made available to insurance provider 110. If it is determined that the insured party has consented to the data indicative of the operational condition of standby generator 104 and/or the data indicative of the amount of residential property 102 to which standby generator 104 is configured to supply power being made available to insurance provider 110, it may not be determined whether the insured party has consented to the data indicative of whether a standby generator is associated with residential property 102 being made available to insurance provider 110.

In one aspect, the insured party may consent to a vendor (e.g., vendor 112) of standby generator 104 that provides standby generator 104 for use at residential property 102 making all or a portion of the aforementioned data regarding standby generator 104 available to insurance provider 110, and insurance provider computing device(s) 114 may determine that such consent has been provided (block 602). For instance, insurance provider computing device(s) 114 may receive an indication of such consent from vendor computing device(s) 118 associated with vendor 112 (block 602).

In another aspect, the insured party may consent to all or a portion of the aforementioned data regarding standby generator 104 being made available to insurance provider 110 by way of a smart home device (e.g., smart home device 124, such as an interconnected home or smart home controller), and insurance provider computing device(s) 114 may determine that such consent has been provided by receiving an indication of such consent (block 602). For instance, an employee or contractor of insurance provider 110 may input an indication of such consent to insurance provider computing device(s) 114 or to a computing device(s) (not shown in FIG. 1) coupled thereto (e.g., via computer network 122) in response to receiving such an indication from the insured party (block 602).

If it is determined that the insured party has not consented to at least some data regarding a standby generator (e.g., standby generator 104) being made available to insurance provider 110, method 600 may continue to a determination of whether the insured party is to provide at least some data regarding a standby generator to insurance provider 110 (e.g., in person at an office of insurance provider 110, via computing device 106 or remote computing device 108, or otherwise not via vendor 112 or smart home device 124) (block 604). For instance, an employee or contractor of insurance provider 110 may input an indication into an insurance provider computing device (e.g., one of insurance provider computing device(s) 114) that the data regarding standby generator 104 is to be provided to insurance provider 110 by the insured party in response to receiving such an indication from the insured party (block 604). In this manner, the insured party may decline to consent to (e.g., may "opt out" of) the data regarding standby generator 104 being made available to insurance provider 110 by vendor 112 or smart home device 124, and such data may still be received by insurance provider 110 to allow the insured party to receive more favorable rating(s) and/or premium(s), for example, based upon available data regarding standby generator 104 of the insured party (block 604).

In one aspect, the determination described with respect to block 604 may include determining whether the insured party is to provide at least the data indicative of whether a standby generator (e.g., standby generator 104) is associated with residential property 102 to insurance provider 110. The determination described with respect to block 604 may also or alternatively include determining whether the insured party is to provide, to insurance provider 110, one or more of the data indicative of the operational condition of standby generator 104 and/or the data indicative of the amount of residential property 102 to which standby generator 104 is configured to supply power. If it is determined that the insured party is to provide, to insurance provider 110, the data indicative of the operational condition of standby generator 104 and/or the data indicative of the amount of residential property 102 to which standby generator 104 is configured to supply power, it may not be determined whether the insured party is to provide to insurance provider 110 the data indicative of whether a standby generator is associated with residential property 102.

If it is determined that no data regarding standby generator 104 is to be provided by the insured party to insurance provider 110, method 600 may revert to the determination described with respect to block 602, and no opportunity for more favorable terms of residential insurance coverage (e.g., rating(s), premium(s), etc.) may be provided to the insured party. In this instance, the insured party may not receive an opportunity for more favorable terms of residential insurance coverage based upon having an installed standby generator unless/until it is determined either that the insured party has consented to at least some data regarding the standby generator being made available as described with respect to block 602 or that the insured party is to provide at least some data regarding the standby generator as described with respect to block 604. If it is determined that at least some data regarding the standby generator is to be provided to insurance provider 110 by the insured party, or if it is determined with respect to block 602 that the insured party has consented to at least some data regarding the standby generator being made available to insurance provider 110 (e.g., by vendor 112 or smart home device 124), method 600 may continue (block 606).

The method 600 may include receiving (e.g., at insurance provider computing device(s) 114 associated with insurance provider 110), from a source other than insurance provider 110, data that is indicative of whether a standby generator (e.g., standby generator 104) is associated with residential property 102 (block 606). Residential property 102 may be residential property for which residential insurance coverage (e.g., homeowners' insurance) is provided by insurance provider 110, and/or may be residential property for which insurance provider 110 is a prospective provider of residential insurance coverage (e.g., homeowners' insurance, further coverage under an existing homeowners' insurance policy, etc.) (block 606). In one aspect, the data indicative of whether a standby generator is associated with residential property 102 may indicate whether a standby generator (e.g., standby generator 104) is installed at residential property 102 and configured to provide power to at least a portion of residential property 102 in the event of an outage of the main power supplied to residential property 102, as discussed elsewhere herein (block 606).

When the insured party consents to the data indicative of whether a standby generator is associated with residential property 102 being made available to insurance provider 110 (as may be determined when performing the actions described with respect to block 602), such data may in one aspect be received from vendor 112 (e.g., at insurance provider computing device(s) 114 from vendor computing device(s) 118), as discussed elsewhere herein (block 606). As such, vendor 112 may be the source other than insurance provider 110 (block 606). In one aspect, insurance provider computing device(s) 114 may access the data indicative of whether a standby generator is associated with residential property 102 from vendor 112 (e.g., from vendor computing device(s) 118 and/or vendor database(s) 120) (block 606). In another aspect, such data may be received from smart home device 124, as discussed elsewhere herein, and thus smart home device 124 may be the source other than insurance provider 110 (block 606). Insurance provider computing device(s) 114 may access such data from smart home device 124, such as via computer network 122 (block 606).

When the data indicative of whether a standby generator is associated with residential property 102 is to be provided to insurance provider 110 by the insured party (as may be determined when performing the actions described with respect to block 604), such data may be received in any suitable form such as manually from the insured party, or otherwise from the insured party without being received from vendor 112 or smart home device 124, as discussed elsewhere herein (block 606). In such aspects, the insured party may be the source other than insurance provider 110 from which the data indicative of whether a standby generator is associated with residential property 102 is received (block 606).

The method 600 may include receiving (e.g., at insurance provider computing device(s) 114), when data is available from a source other than insurance provider 110 that is indicative of an operational condition of standby generator 104, such data indicative of the operational condition of standby generator 104 (block 608). In one aspect, receiving the data indicative of the operational condition of standby generator 104 may include receiving, at insurance provider computing device(s) 114, at least one of: (a) data indicative of whether an oil change is needed for standby generator 104 (e.g., oil condition data 212); (b) data indicative of whether an oil filter of standby generator 104 needs to be replaced (e.g., oil filter condition data 214); (c) data indicative of whether one or more spark plugs of standby generator 104 need to be replaced (e.g., spark plug condition data 216); (d) data indicative of whether an air filter of standby generator 104 needs to be replaced (e.g., air filter condition data 218); (e) data indicative of whether an air filter pre-cleaner of standby generator 104 needs to be replaced (e.g., air filter pre-cleaner condition data 220); or (f) data indicative of whether a battery level of a battery of standby generator 104 needs to be increased (e.g., battery level condition data 222) (block 608). In one aspect, receiving the data indicative of the operational condition of standby generator 104 may include receiving operational condition dataset 200 or data therein (block 608). In another aspect, receiving the data indicative of the operational condition of standby generator 104 may include receiving standby generator dataset 400 or data therein (block 608).

In one aspect, the source other than insurance provider 110 from which the data indicative of the operational condition of standby generator 104 is available and received may be, but need not be, the same source from which the data described with respect to block 606 is received (block 608). For instance, the data indicative of whether a standby generator (e.g., standby generator 104) is associated with residential property 102 may be received from vendor 112 at the time of installation of standby generator 104, and the data indicative of the operational condition of standby generator 104 may be received from smart home device 124, in one example (block 608). Generally speaking, each of the data described with respect to block 606 and the data described with respect to block 608 may be received from any suitable sources.

When the insured party consents to the data indicative of the operational condition of standby generator 104 being made available to insurance provider 110 (as may be determined when performing the actions described with respect to block 602), such data may in one aspect be received from vendor 112 (e.g., at insurance provider computing device(s) 114 from vendor computing device(s) 118), as discussed elsewhere herein (block 608). As such, vendor 112 may be the source other than insurance provider 110 (block 608). In one aspect, insurance provider computing device(s) 114 may access the data indicative of the operational condition of standby generator 104 from vendor 112 (e.g., from vendor computing device(s) 118 and/or vendor database(s) 120) (block 608). In another aspect, the data indicative of the operational condition of standby generator 104 may be received from smart home device 124, as discussed elsewhere herein, and thus smart home device 124 may be the source other than insurance provider 110 (block 608). Insurance provider computing device(s) 114 may access the data indicative of the operational condition of standby generator 104 from smart home device 124, such as via computer network 122 (block 608).

When the data indicative of the operational condition of standby generator 104 is to be provided to insurance provider 110 by the insured party (as may be determined when performing the actions described with respect to block 604), such data may be received in any suitable form such as manually from the insured party, or otherwise from the insured party without being received from vendor 112 or smart home device 124, as discussed elsewhere herein (block 608). In such aspects, the insured party may be the source other than insurance provider 110 from which the data indicative of the operational condition of standby generator 104 is received (block 608).

The method 600 may include receiving (e.g., at insurance provider computing device(s) 114) data indicative of an amount of residential property 102 to which standby generator 104 is configured to supply power (block 610). In various aspects, the indicated amount of residential property 102 may be a percentage or fraction of residential property 102; a number of device(s)/element(s) of residential property 102 to which backup power is configured to be supplied; a percentage or fraction of such device(s)/element(s); and/or any other suitable indication, including example indications discussed elsewhere herein (block 610).

In one example, the data indicative of the amount of residential property 102 to which standby generator 104 is configured to supply power may include data indicative of whether standby generator 104 is configured to supply power to at least one of (e.g., respective indications of whether or not standby generator 104 is configured to supply power to each of): a heating element (e.g., heating element 314); a sump pump (e.g., sump pump 316); a refrigerator (e.g., refrigerator 308); a freezer (e.g., freezer 310); a stove (e.g., stove 344); an oven (e.g., conventional oven 346 and/or microwave oven 312); one or more electronic devices (e.g., modem 318, router 320, television 322, and/or computing device 106); one or more lighting elements (e.g., first light fixture 340, second light fixture 342, and/or third light fixture 348); one or more home security devices (e.g., home security and monitoring system 324); one or more life safety devices (e.g., carbon monoxide detector 326 and/or smoke detector 328); a water well pump (e.g., water well pump 330); a sewage pump (e.g., sewage pump 332); a septic pump (e.g., septic pump 334); a furnace or air conditioning unit; and/or any other suitable device(s)/element(s) of residential property 102 (block 610). Receiving the data indicative of the amount of residential property 102 to which standby generator 104 is configured to supply power may include receiving standby generator dataset 400 or data therein (block 610).

In one aspect, the data indicative of the amount of residential property 102 to which standby generator 104 is configured to supply power may be received from a source other than insurance provider 110 (block 610). The source other than insurance provider 110 from which such data is received may be, but need not be, the same source from which the data described with respect to block 606 and/or the data described with respect to block 608 is received (block 610). For instance, the data indicative of the operational condition of standby generator 104 may be received from smart home device 124, and the data indicative of the amount of residential property 102 to which standby generator 104 is configured to supply power may be received from vendor 112, in one example (block 610). Generally speaking, the data described with respect to block 610 may be received from any suitable source.

When the insured party consents to the data indicative of the amount of residential property 102 to which standby generator 104 is configured to supply power being made available to insurance provider 110 (as may be determined when performing the actions described with respect to block 602), such data may in one aspect be received from vendor 112, as discussed elsewhere herein (block 610). In one aspect, insurance provider computing device(s) 114 may access the data indicative of the amount of residential property 102 to which standby generator 104 is configured to supply power from vendor 112 (e.g., from vendor computing device(s) 118 and/or vendor database(s) 120) (block 610). In another aspect, the data indicative of the amount of residential property 102 to which standby generator 104 is configured to supply power may be received from smart home device 124, as discussed elsewhere herein (block 610). Insurance provider computing device(s) 114 may access the data indicative of the amount of residential property 102 to which standby generator 104 is configured to supply power from smart home device 124, such as via computer network 122 (block 610).

With reference to the discussion elsewhere herein, when the data indicative of the amount of residential property 102 to which standby generator 104 is configured to supply power is to be provided to insurance provider 110 by the insured party (as may be determined when performing the actions described with respect to block 604), such data may be received in any suitable form such as manually from the insured party, or otherwise from the insured party without being received from vendor 112 or smart home device 124 (block 610).

The method 600 may include determining (e.g., by a processor(s) of insurance provider computing device(s) 114) the data associated with the terms of the residential insurance coverage for residential property 102 based upon at least one of the data indicative of whether a standby generator (e.g., standby generator 104) is associated with residential property 102 or the data indicative of the operational condition of standby generator 104 (block 612). As discussed elsewhere herein, the data associated with the terms of the residential insurance coverage may include at least one of a rating(s) associated with the residential insurance coverage for residential property 102 or a premium(s) associated with the residential insurance coverage for residential property 102 (block 612).

In one aspect, determining the data associated with the terms of the residential insurance coverage based upon the aforementioned data may include using a model(s) or portion(s) thereof, such as at least a portion of a residential insurance model determined in the manner discussed with respect to the method 500 (block 612). For instance, with reference to the description of the method 500, discount amounts, percentages, rating changes, etc. may be determined that account for the data indicative of whether a standby generator is associated with residential property 102, the data indicative of the operational condition of standby generator 104, and/or any other suitable data (block 612). With further reference to the description of the method 500, such discount amounts, percentages, rating changes, etc. may then be applied in determining the data associated with the terms of the residential insurance coverage (block 612).

With still further reference to the description of the method 500, discount amounts, discount percentages, rating changes, etc. may vary based upon any suitable factors, such as the example factors discussed above. In one example, determining the data associated with the terms of the residential insurance coverage may include at least one of reducing a favorability of a rating (e.g., determining a less favorable rating than would otherwise be determined) associated with the residential insurance coverage and/or increasing a premium (e.g., determining a higher premium than would otherwise be determined) associated with the residential insurance coverage based upon the data indicative of the operational condition of standby generator 104 (block 612). For instance, such a reduced-favorability rating and/or increased premium may be determined when the data indicative of the operational condition of standby generator 104 (e.g., as represented in operational condition dataset 200) indicates at least one of that an oil change is needed for standby generator 104; that an oil filter of standby generator 104 needs to be replaced; that one or more spark plugs of standby generator 104 need to be replaced; that an air filter of standby generator 104 needs to be replaced; that an air filter pre-cleaner of standby generator 104 needs to be replaced; that a battery level of a battery of standby generator 104 needs to be increased; standby generator 104 maintenance is required or due; and/or any other adverse indication of the operational condition of standby generator 104 (block 612).

Correspondingly, in another example, determining the data associated with the terms of the residential insurance coverage may include at least one of increasing a favorability of a rating (e.g., determining a more favorable rating than would otherwise be determined) associated with the residential insurance coverage and/or decreasing a premium (e.g., determining a lower premium than would otherwise be determined) associated with the residential insurance coverage based upon the data indicative of the operational condition of standby generator 104 (block 612).

The method 600 may include determining (e.g., by a processor(s) of insurance provider computing device(s) 114) the data associated with the terms of the residential insurance coverage for residential property 102 further based upon the data indicative of the amount of residential property 102 to which standby generator 104 is configured to supply power (e.g., when the determination described with respect to block 610 is performed) (block 614). In one aspect, the determination described with respect to block 614 may include determining a rating(s) associated with the residential insurance coverage (which may be the same rating(s) determined as described with respect to block 612 or may be a different rating(s)) based upon the data indicative of the amount of residential property 102 to which standby generator 104 is configured to supply power. In another aspect, the determination described with respect to block 614 may also or alternatively include determining a premium(s) associated with the residential insurance coverage (which may be the same premium(s) determined as described with respect to block 612 or may be a different premium(s), such as a premium(s) for a different coverage type(s) provided as part of the residential insurance coverage) based upon the data indicative of the amount of residential property 102 to which standby generator 104 is configured to supply power.

In one aspect, determining the data associated with the terms of the residential insurance coverage further based upon the data indicative of the amount of residential property 102 to which standby generator 104 is configured to supply power may include using a model(s) or portion(s) thereof, such as at least a portion of a residential insurance model determined in the manner discussed with respect to the method 500 (block 614). For instance, with reference to the description of the method 500, discount amounts, percentages, rating changes, etc. may be determined that account for the data indicative of the amount of residential property 102 to which standby generator 104 is configured to supply power and/or any other suitable data (block 614). With further reference to the description of the method 500, such discount amounts, percentages, rating changes, etc. may then be applied in determining the data associated with the terms of the residential insurance coverage (block 614). Such discount amounts, percentages, rating changes, etc. may vary based upon any suitable factors, such as the example factors discussed above (block 614). It should be appreciated that in some instances, where the determinations described with respect to block 612 and block 614 are both performed, the determination of the data associated with the terms of the residential insurance coverage may be a single (e.g., concurrent) determination even though blocks 612 and blocks 614 are shown as separate blocks. In some instances, the determination described with respect to block 614 may also or alternatively have the effect of modifying the determination described with respect to block 612.

The method 600 may include adjusting (e.g., by a processor(s) of insurance provider computing device(s) 114) the data associated with the terms of the residential insurance coverage for residential property 102 based upon receiving data indicative of an update to whether standby generator 104 is associated with residential property 102 and/or data indicative of an updated operational condition of standby generator 104 (e.g., an updated version of operational condition dataset 200) (block 616). In another aspect, adjusting the data associated with the terms of the residential insurance coverage as described with respect to block 616 may be further based upon receiving data indicative of an update to the amount of residential property 102 to which standby generator 104 is configured to supply power (e.g., an updated version of standby generator dataset 400) (block 616).

In any event, adjusting the data associated with the terms of the residential insurance coverage as described with respect to block 616 may advantageously allow continued determination of an appropriate rating(s) and/or premium(s) associated with the residential insurance coverage (block 616). In this manner, such rating(s) and/or premium(s) may change over time to reflect changes in whether standby generator 104 is associated with residential property 102, changes in the operational condition of standby generator 104, and/or changes in the amount of residential property 102 to which standby generator 104 is configured to supply power, for example (block 616).

In one aspect, adjusting the data associated with the terms of the residential insurance coverage may include using a model(s) or portion(s) thereof, such as at least a portion of a residential insurance model determined in the manner discussed with respect to the method 500 (block 616). For instance, with reference to the description of the method 500, discount amounts, percentages, rating changes, etc. may be adjusted in order to account for an update to whether standby generator 104 is associated with residential property 102, an updated operational condition of standby generator 104, and/or an update to the amount of residential property 102 to which standby generator 104 is configured to supply power, for example (block 616). Adjustments to such discount amounts, percentages, rating changes, etc. may vary based upon any suitable factors, such as the example factors discussed above (block 616).

The method 600 may include receiving (e.g., at insurance provider computing device(s) 114 from, for instance, vendor 112 or smart home device 124) data indicative of an amount of use of standby generator 104 to supply power to residential property 102 (e.g., during an outage of the main power supplied thereto) during a period of time (block 618). The period of time may, for instance, be any suitable predetermined or threshold period of time (block 618).

The method 600 may include determining (e.g., by a processor(s) of insurance provider computing device(s) 114) an indication of a quality of an electrical network (e.g., a power grid(s) or a portion(s) thereof) that provides power to residential property 102 and to additional residential property based upon the data indicative of the amount of use of standby generator 104 to supply power during the period of time (block 620). The additional residential property may be, for instance, one or more other (e.g., neighboring) houses, condominium buildings, and/or other suitable additional residential property (block 620). In one aspect, the additional residential property may include an entire nearby neighborhood or neighborhoods, depending upon the configuration of the electrical network and the number of residential properties served by the electrical network (block 620). Thus, it should be appreciated that references herein to the "additional residential property" may in some instances refer to multiple additional residential properties such as multiple homes, condominium buildings, etc. in addition to residential property 102 (block 620).

In one aspect, determining the indication of the quality (e.g., "health") of the electrical network may include determining the indication further based upon one or more factors such as a number of power outages during the period of time (e.g., a number of different times standby generator 104 was used during the period of time); an average duration of power outages during the period of time (e.g., an average duration of use of standby generator 104 during the period of time); a number of power outages and/or amount of use of standby generator 104 during the period of time that coincide(s) with severe weather events and/or other events that increase the likelihood of a power outage (e.g., with a high number of outages and/or amount of use of standby generator 104 coinciding with such events indicating a greater susceptibility of the electrical network to outages caused by such events); and/or any other suitable factor(s) (block 620).

The method 600 may include determining (e.g., by a processor(s) of insurance provider computing device(s) 114), based upon the indication of the quality of the electrical network, a rating(s) and/or a premium(s) associated with additional residential insurance coverage for the additional residential property (block 622). The additional residential insurance may include one or more policies for residential insurance coverage other than the residential insurance coverage provided with respect to residential property 102 depending upon, for instance, the number of additional residential properties (e.g., the number of additional homes, condominium buildings, etc.) (block 622). In another aspect, any other suitable data associated with terms of the additional residential insurance coverage may also or alternatively be determined based upon the indication of the quality of the electrical network (block 622).

In one aspect, determining the rating(s), premium(s), and/or any other suitable data associated with terms of the additional residential insurance coverage may include determining discount amounts, discount percentages, rating changes, etc. for the additional residential insurance coverage based upon the indication of the quality of the electrical network (block 622). In this manner, the additional residential insurance coverage may advantageously be provided for the additional residential property with, for instance, a rating(s) and/or a premium(s) that reflect the quality of the electrical network providing power to the additional residential property, without the need for the additional residential property to have a standby generator(s) associated therewith (block 622).

The method 600 may include additional, less, or alternate actions, including those discussed elsewhere herein, and/or may be implemented via an appropriate computing device(s) and/or processors thereof (e.g., insurance provider computing device(s) 114, vendor computing device(s) 118, computing device 106, remote computing device 108, and/or smart home device 124, etc.), or via computer-executable instructions stored on non-transitory computer-readable medium or media.

Exemplary Computing Device

Figure 7:
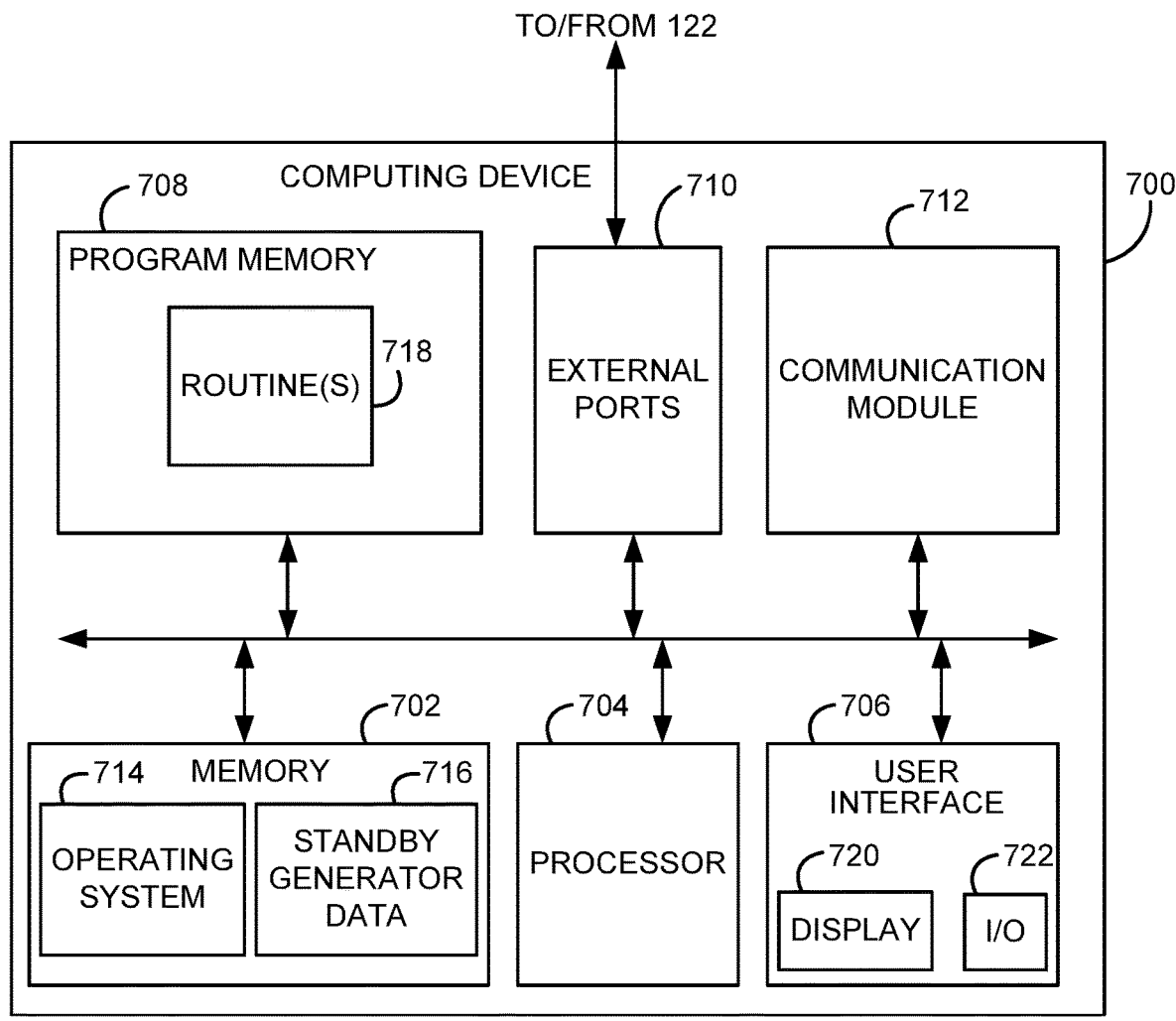
FIG. 7 illustrates a block diagram of an exemplary computing device 700 that may implement one or more of the functionalities discussed herein in accordance with an exemplary aspect of the present disclosure.

FIG. 7 illustrates a diagram of an exemplary computing device 700 that may implement one or more of the functionalities discussed herein. Computing device 700 may be an implementation of any suitable computing device discussed herein, such as, for instance, an implementation of a computing device of insurance provider computing device(s) 114. While computing device 700 is illustrated as including certain components and functionality, it should be appreciated that additional, alternate, or fewer components and/or functionality may be included in computing device 700 (e.g., in any one or more of the computing devices discussed elsewhere herein).

Computing device 700 may include a memory 702, a processor 704, a user interface 706, a program memory 708, external ports 710, and a communication module 712. In an aspect, memory 702 may store an operating system 714 configured to facilitate the functionality of computing device 700 as described herein, and may store standby generator data 716. In an aspect, standby generator data 716 may include any suitable data regarding a standby generator (e.g., standby generator 104) associated with residential property (e.g., residential property 102), such as data indicative of whether a standby generator is associated with residential property 102, data indicative of an operational condition of standby generator 104, and/or data indicative of an amount of residential property 102 to which standby generator 104 is configured to supply power, as discussed elsewhere herein. Standby generator data 716 may be received as described elsewhere herein, and may, for instance, be received at insurance provider computing device(s) 114 via computer network 122, in some examples. Example communication between computing device 700 and computer network 122 is further described below.

Program memory 708 may store one or more routines or applications (e.g., machine readable instructions) 718. For instance, when computing device 700 is a computing device of insurance provider computing device(s) 114, routine(s) 718 may include a routine configured to use standby generator data (e.g., standby generator data 716) to determine data associated with terms of residential insurance coverage, such as in the manner described with respect to the method 600. It should be appreciated that other routine(s) and/or application(s) are envisioned, including when computing device 700 is an implementation of a computing device other than a computing device of insurance provider computing device(s) 114 (e.g., one of vendor computing device(s) 118).

Processor 704 may interface with memory 702 to execute operating system 714 and routine(s) 718. In some aspects, routine(s) 718 may access standby generator data 716 to determine the data associated with the terms of the residential insurance coverage, as described elsewhere herein. Memory 702 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and/or other suitable form(s) of memory.

Communication module 712 may be configured to communicate data, such as standby generator data 716 and/or the determined data associated with the terms of the residential insurance coverage, via one or more networks such as computer network 122. In one aspect, communication module 712 may include one or more transceivers (e.g., WWAN, WLAN, WPAN transceivers, and/or any other suitable type(s) of transceiver(s)) functioning in accordance with IEEE standards, 3GPP standards, or other standards, and configured to receive and transmit data via external ports 710. Thus, the one or more transceivers may be regarded as associated with processor 702 and/or as associated with computing device 700. In one aspect, only a single external port 710 may be implemented in computing device 700. For instance, communication module 712 may send, via computer network 122, the determined data associated with the terms of the residential insurance coverage to, for example, another computing device of insurance provider 110 (e.g., a computing device at an office of insurance provider 110), a computing device of the insured party (e.g., computing device 106 and/or remote computing device 108), and/or any other suitable computing device(s).

User interface 706 may be configured to present information to a user and/or receive inputs from the user. As illustrated in FIG. 7, user interface 706 may include a display 720 and I/O components 722 (e.g., ports, capacitive or resistive touch sensitive input panels, keys, buttons, lights, LEDs, speakers, microphones, etc.). The user may access the computing device 700 via user interface 706 to view and/or use standby generator data 716, to view and/or use the determined data associated with the terms of the residential insurance coverage, and/or to perform any other suitable function(s). In one aspect, computing device 700 may perform the functionalities as discussed herein as part of a "cloud" network and/or may otherwise communicate with other hardware or software components within the cloud to send, retrieve, and/or otherwise analyze data. It should be appreciated that in view of the various components thereof, computing device 700 may also be referred to as a "computer system." It should be further appreciated that multiple implementations of computing device 700 (e.g., where insurance provider computing device(s) 114 includes more than one insurance provider computing device) may also be referred to as a "computer system."

In general, a computer program product in accordance with an aspect may include a non-transitory computer-readable storage medium (e.g., standard random access memory (RAM), an optical disc, a universal serial bus (USB) drive, or the like) having computer-readable program code embodied therein, wherein the computer-readable program code is configured/adapted to be executed by processor 704 (e.g., working in connection with operating system 714) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML, etc.). In some aspects, the computer program product may be part of a cloud network of resources.

Exemplary Method of Using Standby Generator Data

As depicted by, and discussed in relation to, FIGS. 1-7, for example, in one aspect, a computer-implemented method of using standby generator data to determine data associated with terms of residential insurance coverage may be provided. The method may include (1) receiving, at one or more insurance provider computing devices associated with an insurance provider (such as via wireless communication or data transmission over one or more radio frequency links or wireless communication channels), data from a source other than the insurance provider that is indicative of whether a standby generator is associated with residential property, the residential property being at least one of residential property for which the residential insurance coverage is provided by the insurance provider or residential property for which the insurance provider is a prospective provider of the residential insurance coverage; (2) receiving, at the one or more insurance provider computing devices (such as via wireless communication or data transmission over one or more radio frequency links or wireless communication channels) when data from a source other than the insurance provider that is indicative of an operational condition of the standby generator is available, the data indicative of the operational condition of the standby generator; and/or (3) determining, by one or more processors of the one or more insurance provider computing devices, the data associated with the terms of the residential insurance coverage for the residential property based upon at least one of the data indicative of whether the standby generator is associated with the residential property or the data indicative of the operational condition of the standby generator.

The method may include adjusting, by the one or more processors of the one or more insurance provider computing devices, the data associated with the terms of the residential insurance coverage for the residential property based upon receiving at least one of data indicative of an update to whether the standby generator is associated with the residential property or data indicative of an updated operational condition of the standby generator.

Receiving the data indicative of whether the standby generator is associated with the residential property may include receiving, by the one or more processors of the one or more insurance provider computing devices, the data indicative of whether the standby generator is associated with the residential property from one or more vendor computing devices, the one or more vendor computing devices associated with a vendor that provides the standby generator for use at the residential property, in response to an insured party associated with the residential property consenting to the vendor making the data indicative of whether the standby generator is associated with the residential property available to the insurance provider. Receiving the data indicative of the operational condition of the standby generator may include receiving, by the one or more processors of the one or more insurance provider computing devices, the data indicative of the operational condition of the standby generator from the one or more vendor computing devices in response to the insured party consenting to the vendor making the data indicative of the operational condition of the standby generator available to the insurance provider.

Receiving the data indicative of whether the standby generator is associated with the residential property may include receiving, by the one or more processors of the one or more insurance provider computing devices, the data indicative of whether the standby generator is associated with the residential property from a smart home device communicatively coupled to the standby generator in response to an insured party associated with the residential property consenting to the data indicative of whether the standby generator is associated with the residential property being made available to the insurance provider. Receiving the data indicative of the operational condition of the standby generator may include receiving, by the one or more processors of the one or more insurance provider computing devices (such as via wireless communication or data transmission over one or more radio frequency links or wireless communication channels), the data indicative of the operational condition of the standby generator from the smart home device in response to the insured party consenting to the data indicative of the operational condition of the standby generator being made available to the insurance provider.

Receiving the data indicative of the operational condition of the standby generator may include receiving, at the one or more insurance provider computing devices, at least one of data indicative of whether an oil change is needed for the standby generator, data indicative of whether an oil filter of the standby generator needs to be replaced, data indicative of whether one or more spark plugs of the standby generator need to be replaced, data indicative of whether an air filter of the standby generator needs to be replaced, data indicative of whether an air filter pre-cleaner of the standby generator needs to be replaced, or data indicative of whether a battery level of a battery of the standby generator needs to be increased. Determining the data associated with the terms of the residential insurance coverage may include at least one of reducing a favorability of a rating associated with the residential insurance coverage or increasing a premium associated with the residential insurance coverage when the data indicative of the operational condition of the standby generator indicates at least one of that the oil change is needed, that the oil filter needs to be replaced, that the one or more spark plugs need to be replaced, that the air filter needs to be replaced, that the air filter pre-cleaner needs to be replaced, or that the battery level needs to be increased.

The method may include receiving, at the one or more insurance provider computing devices, data indicative of an amount of the residential property to which the standby generator is configured to supply power. The method may also include determining, by the one or more processors of the one or more insurance provider computing devices, the data associated with the terms of the residential insurance coverage further based upon the data indicative of the amount of the residential property to which the standby generator is configured to supply power by at least one of determining a rating associated with the residential insurance coverage based upon the data indicative of the amount of the residential property to which the standby generator is configured to supply power or determining a premium associated with the residential insurance coverage based upon the data indicative of the amount of the residential property to which the standby generator is configured to supply power. The data indicative of the amount of the residential property to which the standby generator is configured to supply power may include data indicative of whether the standby generator is configured to supply power to at least one of a heating element, a sump pump, a refrigerator, a freezer, a stove, an oven, one or more electronic devices, one or more lighting elements, one or more home security devices, one or more life safety devices, a water well pump, a sewage pump, or a septic pump.

The method may include receiving, at the one or more insurance provider computing devices, data indicative of an amount of use of the standby generator to supply power during a period of time. The method may also include determining, by the one or more processors of the one or more insurance provider computing devices, an indication of a quality of an electrical network that provides power to the residential property and to additional residential property based upon the data indicative of the amount of use of the standby generator to supply power during the period of time. The method may further include determining, by the one or more processors of the one or more insurance provider computing devices, based upon the indication of the quality of the electrical network that provides power to the residential property and to the additional residential property, at least one of a rating associated with additional residential insurance coverage for the additional residential property or a premium associated with the additional residential insurance coverage.

The method may include additional, less, or alternate functionality, including that discussed elsewhere herein, and/or may be implemented via an appropriate computing device(s) and/or processors thereof, or via computer-executable instructions stored on non-transitory computer-readable medium or media.

Exemplary Computer System Configured to Use Standby Generator Data

As depicted by, and discussed in relation to, FIGS. 1-7, for example, in one aspect, a computer system configured to use standby generator data to determine data associated with terms of residential insurance coverage may be provided. The computer system may include at least one of one or more processors or associated transceivers. The at least one of the one or more processors or the associated transceivers may be configured to: (1) receive data from a source other than an insurance provider that is indicative of whether a standby generator is associated with residential property (such as via wireless communication or data transmission over one or more radio frequency links or wireless communication channels), the residential property being at least one of residential property for which the residential insurance coverage is provided by the insurance provider or residential property for which the insurance provider is a prospective provider of the residential insurance coverage; (2) receive, when data from a source other than the insurance provider that is indicative of an operational condition of the standby generator is available (such as via wireless communication or data transmission over one or more radio frequency links or wireless communication channels), the data indicative of the operational condition of the standby generator; and/or (3) determine the data associated with the terms of the residential insurance coverage for the residential property based upon at least one of the data indicative of whether the standby generator is associated with the residential property or the data indicative of the operational condition of the standby generator.

The at least one of the one or more processors or the associated transceivers may be configured to adjust the data associated with the terms of the residential insurance coverage for the residential property based upon the at least one of the one or more processors or the associated transceivers receiving at least one of data indicative of an update to whether the standby generator is associated with the residential property or data indicative of an updated operational condition of the standby generator.

The at least one of the one or more processors or the associated transceivers may be configured to receive the data indicative of whether the standby generator is associated with the residential property from one or more vendor computing devices, the one or more vendor computing devices associated with a vendor that provides the standby generator for use at the residential property, in response to an insured party associated with the residential property consenting to the vendor making the data indicative of whether the standby generator is associated with the residential property available to the insurance provider. The at least one of the one or more processors or the associated transceivers may be configured to receive the data indicative of the operational condition of the standby generator from the one or more vendor computing devices in response to the insured party consenting to the vendor making the data indicative of the operational condition of the standby generator available to the insurance provider.

The at least one of the one or more processors or the associated transceivers may be configured to receive the data indicative of whether the standby generator is associated with the residential property from a smart home device communicatively coupled to the standby generator in response to an insured party associated with the residential property consenting to the data indicative of whether the standby generator is associated with the residential property being made available to the insurance provider. The at least one of the one or more processors or the associated transceivers may be configured to receive the data indicative of the operational condition of the standby generator from the smart home device in response to the insured party consenting to the data indicative of the operational condition of the standby generator being made available to the insurance provider.

The data indicative of the operational condition of the standby generator may include at least one of data indicative of whether an oil change is needed for the standby generator, data indicative of whether an oil filter of the standby generator needs to be replaced, data indicative of whether one or more spark plugs of the standby generator need to be replaced, data indicative of whether an air filter of the standby generator needs to be replaced, data indicative of whether an air filter pre-cleaner of the standby generator needs to be replaced, or data indicative of whether a battery level of a battery of the standby generator needs to be increased. The at least one of the one or more processors or the associated transceivers may be configured to at least one of reduce a favorability of a rating associated with the residential insurance coverage or increase a premium associated with the residential insurance coverage when the data indicative of the operational condition of the standby generator indicates at least one of that the oil change is needed, that the oil filter needs to be replaced, that the one or more spark plugs need to be replaced, that the air filter needs to be replaced, that the air filter pre-cleaner needs to be replaced, or that the battery level needs to be increased.

The at least one of the one or more processors or the associated transceivers may be configured to receive data indicative of an amount of the residential property to which the standby generator is configured to supply power. The at least one of the one or more processors or the associated transceivers may also be configured to determine the data associated with the terms of the residential insurance coverage further based upon the data indicative of the amount of the residential property to which the standby generator is configured to supply power by at least one of determining a rating associated with the residential insurance coverage based upon the data indicative of the amount of the residential property to which the standby generator is configured to supply power or determining a premium associated with the residential insurance coverage based upon the data indicative of the amount of the residential property to which the standby generator is configured to supply power. An updated insurance discount for the property may be determined or calculated, such as using the foregoing standby generator-related data collected, and transmitted to a customer mobile device for their review and approval via wireless communication or data transmission via wireless communication or data transmission over one or more radio links or wireless communication channels.

The computer system may be configured with additional, less, or alternate functionality, including that discussed elsewhere herein.

Exemplary System of Using Standby Generator Data

As depicted by, and discussed in relation to, FIGS. 1-7, for example, in one aspect, a system of using standby generator data to determine data associated with terms of residential insurance coverage may be provided. The system may include one or more insurance provider computing devices associated with an insurance provider. The one or more insurance provider computing devices may be configured to: (1) receive data from a source other than the insurance provider (such as via wireless communication or data transmission over one or more radio frequency links or wireless communication channels) that is indicative of whether a standby generator is associated with residential property, the residential property being at least one of residential property for which the residential insurance coverage is provided by the insurance provider or residential property for which the insurance provider is a prospective provider of the residential insurance coverage; (2) receive (such as via wireless communication or data transmission over one or more radio frequency links or wireless communication channels), when data from a source other than the insurance provider that is indicative of an operational condition of the standby generator is available, the data indicative of the operational condition of the standby generator; (3) determine the data associated with the terms of the residential insurance coverage for the residential property based upon at least one of the data indicative of whether the standby generator is associated with the residential property or the data indicative of the operational condition of the standby generator; (4) adjust the data associated with the terms of the residential insurance coverage for the residential property based upon the one or more insurance provider computing devices receiving at least one of data indicative of an update to whether the standby generator is associated with the residential property or data indicative of an updated operational condition of the standby generator; and/or (5) transmit the updated or adjusted terms of residential insurance coverage and/or associated premiums or discounts to a customer mobile device for their review and/or approval via wireless communication or data transmission over one or more radio frequency links or wireless communication channels.

The one or more insurance provider computing devices may be configured to receive data indicative of an amount of the residential property to which the standby generator is configured to supply power. The one or more insurance provider computing devices may also be configured to determine the data associated with the terms of the residential insurance coverage further based upon the data indicative of the amount of the residential property to which the standby generator is configured to supply power by at least one of determining a rating associated with the residential insurance coverage based upon the data indicative of the amount of the residential property to which the standby generator is configured to supply power or determining a premium associated with the residential insurance coverage based upon the data indicative of the amount of the residential property to which the standby generator is configured to supply power.

The system may include one or more vendor computing devices associated with a vendor that provides the standby generator for use at the residential property. The one or more insurance provider computing devices may be configured to receive the data indicative of the amount of the residential property to which the standby generator is configured to supply power from the one or more vendor computing devices. The one or more insurance provider computing devices may also or alternatively be configured to at least one of receive the data indicative of whether the standby generator is associated with the residential property from the one or more vendor computing devices or receive the data indicative of the operational condition of the standby generator from the one or more vendor computing devices.

The system may include a smart home device communicatively coupled to the standby generator, and the one or more insurance provider computing devices may be configured to at least one of receive the data indicative of whether the standby generator is associated with the residential property from the smart home device or receive the data indicative of the operational condition of the standby generator from the smart home device.

The one or more insurance provider computing devices may be configured to receive data indicative of an amount of use of the standby generator to supply power during a period of time. The one or more insurance provider computing devices may also be configured to determine an indication of a quality of an electrical network that provides power to the residential property and to additional residential property based upon the data indicative of the amount of use of the standby generator to supply power during the period of time. The one or more insurance provider computing devices may further be configured to determine, based upon the indication of the quality of the electrical network that provides power to the residential property and to the additional residential property, at least one of a rating associated with additional residential insurance coverage for the additional residential property or a premium associated with the additional residential insurance coverage.

The system may include additional, less, or alternate functionality, including that discussed elsewhere herein.

ADDITIONAL CONSIDERATIONS

With the foregoing, an insured party may "opt-in" to have data regarding a standby generator associated with residential property made available to an insurance provider, or may itself provide such data to the insurance provider (e.g., manually, via a computing device as discussed herein, etc.), in order to receive an insurance premium discount(s), a more favorable rating(s), etc. The insurance provider (e.g., insurance provider computing device(s)) may determine such data associated with terms of residential insurance coverage based upon the data regarding the standby generator. The insurance provider may also adjust such data associated with terms of residential insurance coverage based upon updates/changes to the data regarding the standby generator. For instance, updates to insurance discounts may be transmitted to customer mobile devices of owners of standby generators for their review or approval, and to reward risk averse customers.

In one aspect, data regarding a standby generator associated with residential property may be received by a vendor that provides the standby generator for use at the residential property (e.g., by one or more vendor computing devices), and may be provided to the insurance provider in response to the consent of the insured party. In another aspect, data regarding the standby generator may be received by a smart home device, such as a smart home controller, and may be provided by the smart home device to the insurance provider in response to the consent of the insured party to such provision of data. The insurance provider may then determine and/or adjust data associated with terms of residential insurance coverage as discussed elsewhere herein. As a result, an insured party with a standby generator that shares or makes available data regarding the standby generator may receive more favorable terms of residential insurance coverage when the standby generator is, for instance, in acceptable operating condition and, in some cases, when the standby generator is configured to supply backup power to a greater amount of the residential property.

Although the disclosure provides several examples in terms of types of data regarding a standby generator that may be received and types of devices that may be employed, aspects include any suitable type(s) and number of computing devices, data, etc.

Although the foregoing text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following considerations also apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors, and/or processor-implemented modules, may be located in a single location (e.g., within a home environment, an office environment or as a server farm), while in other embodiments the processor(s) and/or processor-implemented modules may be distributed across a number of locations.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impracti-

What is claimed:

1. A computer-implemented method of using standby generator data to determine data associated with terms of residential insurance coverage, the method comprising:
   receiving, at one or more insurance provider computing devices associated with an insurance provider, data from a smart home device communicatively coupled to a standby generator that is indicative of whether the standby generator is associated with a residential property;
   receiving, at the one or more insurance provider computing devices from the smart home device, data indicative of an operational condition of the standby generator;
   determining, by one or more processors of the one or more insurance provider computing devices, the data associated with the terms of the residential insurance coverage for the residential property based upon at least one of (i) the data indicative of whether the standby generator is associated with the residential property, or (ii) the data indicative of the operational condition of the standby generator, the data associated with the terms of the residential insurance coverage including at least one of a premium or a favorability of a rating;
   transmitting, from the one or more insurance provider computing devices, an indication of the data associated with the terms of the residential insurance coverage to the smart home device;
   responsive to receiving the indication, generating, by the smart home device, an operation control signal to control an operation of the standby generator based upon the indication;
   transmitting, by the smart home device, the operation control signal to the standby generator causing the standby generator to modify its operation and generate an updated operational condition including a modified maintenance parameter;
   receiving, at the smart home device, the updated operational condition of the standby generator in response to the standby generator executing the operation control signal; and
   adjusting, by the one or more processors of the one or more insurance provider computing devices, the data associated with the terms of the residential insurance coverage for the residential property based upon the updated operational condition received from the smart home device.

2. The computer-implemented method of claim 1, further comprising adjusting, by the one or more processors of the one or more insurance provider computing devices, the data associated with the terms of the residential insurance coverage for the residential property based upon receiving data indicative of an update to whether the standby generator is associated with the residential property.

3. The computer-implemented method of claim 1, wherein at least one of (1) receiving the data indicative of whether the standby generator is associated with the residential property includes receiving, by the one or more processors of the one or more insurance provider computing devices, the data indicative of whether the standby generator is associated with the residential property from one or more vendor computing devices, the one or more vendor computing devices associated with a vendor that provides the standby generator for use at the residential property, in response to an insured party associated with the residential property consenting to the vendor making the data indicative of whether the standby generator is associated with the residential property available to the insurance provider, or (2) receiving the data indicative of the operational condition of the standby generator includes receiving, by the one or more processors of the one or more insurance provider computing devices, the data indicative of the operational condition of the standby generator from the one or more vendor computing devices in response to the insured party consenting to the vendor making the data indicative of the operational condition of the standby generator available to the insurance provider.

4. The computer-implemented method of claim 1, wherein receiving the data indicative of the operational condition of the standby generator includes receiving, at the one or more insurance provider computing devices, a maintenance parameter indicative of at least one of whether an oil change is needed for the standby generator, data indicative of whether an oil filter of the standby generator needs to be replaced, data indicative of whether one or more spark plugs of the standby generator need to be replaced, data indicative of whether an air filter of the standby generator needs to be replaced, data indicative of whether an air filter pre-cleaner of the standby generator needs to be replaced, or data indicative of whether a battery level of a battery of the standby generator needs to be increased, and wherein determining the data associated with the terms of the residential insurance coverage includes at least one of reducing a favorability of a rating associated with the residential insurance coverage or increasing a premium associated with the residential insurance coverage when the maintenance parameter indicates at least one of that the oil change is needed, that the oil filter needs to be replaced, that the one or more spark plugs need to be replaced, that the air filter needs to be replaced, that the air filter pre-cleaner needs to be replaced, or that the battery level needs to be increased.

5. The computer-implemented method of claim 1, further comprising:
   receiving, at the one or more insurance provider computing devices, data indicative of an amount of the residential property to which the standby generator is configured to supply power; and
   determining, by the one or more processors of the one or more insurance provider computing devices, the data associated with the terms of the residential insurance coverage further based upon the data indicative of the amount of the residential property to which the standby generator is configured to supply power by at least one of determining a rating associated with the residential insurance coverage based upon the data indicative of the amount of the residential property to which the standby generator is configured to supply power or determining a premium associated with the residential insurance coverage based upon the data indicative of the amount of the residential property to which the standby generator is configured to supply power.

6. The computer-implemented method of claim 5, wherein the data indicative of the amount of the residential property to which the standby generator is configured to supply power includes data indicative of whether the standby generator is configured to supply power to at least one of a heating element, a sump pump, a refrigerator, a freezer, a stove, an oven, one or more electronic devices, one or more lighting elements, one or more home security devices, one or more life safety devices, a water well pump, a sewage pump, or a septic pump, and wherein the data indicative of the amount of the residential property to which the standby generator is configured to supply power is based on an initial configuration of the standby generator.

7. The computer-implemented method of claim 1, wherein at least one of (1) receiving the data indicative of whether the standby generator is associated with the residential property includes receiving, by the one or more processors of the one or more insurance provider computing devices, the data indicative of whether the standby generator is associated with the residential property from the smart home device communicatively coupled to the standby generator in response to an insured party associated with the residential property consenting to the data indicative of whether the standby generator is associated with the residential property being made available to the insurance provider, or (2) receiving the data indicative of the operational condition of the standby generator includes receiving, by the one or more processors of the one or more insurance provider computing devices, the data indicative of the operational condition of the standby generator from the smart home device in response to the insured party consenting to the data indicative of the operational condition of the standby generator being made available to the insurance provider.

8. The computer-implemented method of claim 1, further comprising:
receiving, at the one or more insurance provider computing devices, data indicative of an amount of use of the standby generator to supply power during a period of time;
determining, by the one or more processors of the one or more insurance provider computing devices, an indication of a quality of an electrical network that provides power to the residential property and to additional residential property based upon the data indicative of the amount of use of the standby generator to supply power during the period of time; and
determining, by the one or more processors of the one or more insurance provider computing devices, based upon the indication of the quality of the electrical network that provides power to the residential property and to the additional residential property, at least one of a rating associated with additional residential insurance coverage for the additional residential property or a premium associated with the additional residential insurance coverage.

9. A computer system configured to use standby generator data to determine data associated with terms of residential insurance coverage, the computer system comprising at least one of one or more processors or associated transceivers, the at least one of the one or more processors or the associated transceivers configured to:
receive data from a smart home device communicatively coupled to a standby generator that is indicative of whether the standby generator is associated with a residential property;
receive, from the smart home device, data indicative of an operational condition of the standby generator;
determine the data associated with the terms of the residential insurance coverage for the residential property based upon at least one of (i) the data indicative of whether the standby generator is associated with the residential property, or (ii) the data indicative of the operational condition of the standby generator, the data associated with the terms of the residential insurance coverage including at least one of a premium or a favorability of a rating;

responsive to determining the data associated with the terms of the residential insurance coverage, transmit an indication of the data associated with the terms of the residential insurance coverage to the smart home device, wherein the smart home device (i) receives the indication, (ii) generates an operation control signal to control an operation of the standby generator, (iii) transmits the operation control signal to the standby generator causing the standby generator to modify its operation and generate an updated operational condition including a modified maintenance parameter, and (iv) receives the updated operational condition of the standby generator; and
adjust the data associated with the terms of the residential insurance coverage for the residential property based upon the at least one of the one or more processors or the associated transceivers receiving the updated operational condition from the smart home device.

10. The computer system of claim 9, wherein the at least one of the one or more processors or the associated transceivers are further configured to adjust the data associated with the terms of the residential insurance coverage for the residential property based upon the at least one of the one or more processors or the associated transceivers receiving data indicative of an update to whether the standby generator is associated with the residential property.

11. The computer system of claim 9, wherein the at least one of the one or more processors or the associated transceivers are configured to at least one of (1) receive the data indicative of whether the standby generator is associated with the residential property from one or more vendor computing devices, the one or more vendor computing devices associated with a vendor that provides the standby generator for use at the residential property, in response to an insured party associated with the residential property consenting to the vendor making the data indicative of whether the standby generator is associated with the residential property available to the insurance provider, or (2) receive the data indicative of the operational condition of the standby generator from the one or more vendor computing devices in response to the insured party consenting to the vendor making the data indicative of the operational condition of the standby generator available to the insurance provider.

12. The computer system of claim 9, wherein the data indicative of the operational condition of the standby generator includes a maintenance parameter indicating at least one of data indicative of whether an oil change is needed for the standby generator, data indicative of whether an oil filter of the standby generator needs to be replaced, data indicative of whether one or more spark plugs of the standby generator need to be replaced, data indicative of whether an air filter of the standby generator needs to be replaced, data indicative of whether an air filter pre-cleaner of the standby generator needs to be replaced, or data indicative of whether a battery level of a battery of the standby generator needs to be increased, and
wherein the at least one of the one or more processors or the associated transceivers are configured to at least one of reduce a favorability of a rating associated with the residential insurance coverage or increase a premium associated with the residential insurance coverage when the maintenance parameter indicates at least one of that the oil change is needed, that the oil filter needs to be replaced, that the one or more spark plugs need to be replaced, that the air filter needs to be replaced, that the air filter pre-cleaner needs to be replaced, or that the battery level needs to be increased.

13. The computer system of claim 9, wherein the at least one of the one or more processors or the associated transceivers are further configured to:
receive data indicative of an amount of the residential property to which the standby generator is configured to supply power; and
determine the data associated with the terms of the residential insurance coverage further based upon the data indicative of the amount of the residential property to which the standby generator is configured to supply power by at least one of determining a rating associated with the residential insurance coverage based upon the data indicative of the amount of the residential property to which the standby generator is configured to supply power or determining a premium associated with the residential insurance coverage based upon the data indicative of the amount of the residential property to which the standby generator is configured to supply power.

14. The computer system of claim 9, wherein the at least one of the one or more processors or the associated transceivers are configured to at least one of (1) receive the data indicative of whether the standby generator is associated with the residential property from the smart home device communicatively coupled to the standby generator in response to an insured party associated with the residential property consenting to the data indicative of whether the standby generator is associated with the residential property being made available to the insurance provider, or (2) receive the data indicative of the operational condition of the standby generator from the smart home device in response to the insured party consenting to the data indicative of the operational condition of the standby generator being made available to the insurance provider.

15. A system of using standby generator data to determine data associated with terms of residential insurance coverage, the system comprising:
one or more insurance provider computing devices associated with an insurance provider, the one or more insurance provider computing devices configured to:
receive data from a smart home device communicatively coupled to a standby generator that is indicative of whether the standby generator is associated with a residential property;
receive, from the smart home device, data indicative of an operational condition of the standby generator;
determine the data associated with the terms of the residential insurance coverage for the residential property based upon at least one of (i) the data indicative of whether the standby generator is associated with the residential property, or (ii) the data indicative of the operational condition of the standby generator, the data associated with the terms of the residential insurance coverage including at least one of a premium or a favorability of a rating;
transmit an indication of the data associated with the terms of the residential insurance coverage to the smart home device, wherein the smart home device (i) receives the indication, (ii) generates an operation control signal to control an operation of the standby generator, (iii) transmits the operation control signal to the standby generator causing the standby generator to modify its operation and generate an updated operational condition including a modified maintenance parameter, and (iv) receives an updated operational condition of the standby generator;
adjust the data associated with the terms of the residential insurance coverage for the residential property based upon the updated operational condition received from the smart home device.

16. The system of claim 15, wherein the one or more insurance provider computing devices are further configured to:
receive data indicative of an amount of the residential property to which the standby generator is configured to supply power; and
determine the data associated with the terms of the residential insurance coverage further based upon the data indicative of the amount of the residential property to which the standby generator is configured to supply power by at least one of determining a rating associated with the residential insurance coverage based upon the data indicative of the amount of the residential property to which the standby generator is configured to supply power or determining a premium associated with the residential insurance coverage based upon the data indicative of the amount of the residential property to which the standby generator is configured to supply power.

17. The system of claim 16, further comprising one or more vendor computing devices associated with a vendor that provides the standby generator for use at the residential property, wherein the one or more insurance provider computing devices are further configured to receive the data indicative of the amount of the residential property to which the standby generator is configured to supply power from the one or more vendor computing devices.

18. The system of claim 15, further comprising one or more vendor computing devices associated with a vendor that provides the standby generator for use at the residential property, wherein the one or more insurance provider computing devices are further configured to at least one of receive the data indicative of whether the standby generator is associated with the residential property from the one or more vendor computing devices or receive the data indicative of the operational condition of the standby generator from the one or more vendor computing devices.

19. The system of claim 15, wherein the one or more insurance provider computing devices are further configured to:
receive data indicative of an amount of use of the standby generator to supply power during a period of time;
determine an indication of a quality of an electrical network that provides power to the residential property and to additional residential property based upon the data indicative of the amount of use of the standby generator to supply power during the period of time; and
determine, based upon the indication of the quality of the electrical network that provides power to the residential property and to the additional residential property, at least one of a rating associated with additional residential insurance coverage for the additional residential property or a premium associated with the additional residential insurance coverage.

* * * * *